US007964051B2

(12) United States Patent
Lynch et al.

(10) Patent No.: US 7,964,051 B2
(45) Date of Patent: Jun. 21, 2011

(54) DOOR SKIN, METHOD OF MANUFACTURING A DOOR PRODUCED THEREWITH, AND DOOR PRODUCED THEREFROM

(75) Inventors: Steven K. Lynch, St. Charles, IL (US); Bei-hong Liang, Naperville, IL (US); Mark A. Ruggie, Franklin Park, IL (US); Jason M. Walsh, St. Charles, IL (US); Henry M. Coghlan, St. Charles, IL (US); Geoffrey B. Hardwick, St. Charles, IL (US)

(73) Assignee: Masonite Corporation, Tampa, FL (US)

( * ) Notice: Subject to any disclaimer, the term of this patent is extended or adjusted under 35 U.S.C. 154(b) by 0 days.

(21) Appl. No.: 11/976,137

(22) Filed: Oct. 22, 2007

(65) Prior Publication Data

US 2008/0041014 A1 Feb. 21, 2008

Related U.S. Application Data

(60) Division of application No. 10/705,257, filed on Nov. 12, 2003, now Pat. No. 7,284,352, which is a continuation-in-part of application No. 10/351,592, filed on Jan. 27, 2003, now Pat. No. 7,370,454, which is a continuation-in-part of application No. 10/291,756, filed on Nov. 12, 2002, now Pat. No. 7,137,232.

(51) Int. Cl.

| | |
|---|---|
| ***B44C 3/08*** | (2006.01) |
| ***B44C 5/04*** | (2006.01) |
| ***B29C 51/16*** | (2006.01) |
| ***B29C 65/00*** | (2006.01) |
| ***B29C 47/00*** | (2006.01) |
| ***B32B 37/00*** | (2006.01) |
| ***E06B 3/70*** | (2006.01) |
| ***E04C 2/54*** | (2006.01) |

(52) U.S. Cl. ........ 156/219; 156/212; 156/228; 156/245; 156/292; 52/456; 52/784.14

(58) Field of Classification Search .................... 52/455, 52/456, 457, 458, 783.1, 784.1, 784.13, 784.14, 52/784.15, 174.16, 784.19; 156/196, 212, 156/219, 228, 230, 236, 242, 245

See application file for complete search history.

(56) References Cited

U.S. PATENT DOCUMENTS

| | | | |
|---|---|---|---|
| 653,400 | A | 7/1900 | Rapp |
| 1,810,321 | A | 6/1931 | Michelman |
| 2,692,450 | A | 10/1954 | Reinemer |
| 2,765,056 | A | 10/1956 | Tyree |

(Continued)

FOREIGN PATENT DOCUMENTS

| | | |
|---|---|---|
| DE | 3423252 | 1/1986 |

(Continued)

*Primary Examiner* — Philip C Tucker
*Assistant Examiner* — Brian R Slawski
(74) *Attorney, Agent, or Firm* — Berenato & White, LLC

(57) ABSTRACT

A door skin comprises an exterior side and an interior side for being secured to a frame member. First and second molded, spaced stiles lie on a first plane. A flat planar portion is disposed between the stiles and lies on a second plane spaced from the first plane. A first interface portion is disposed between and contiguous with the stiles and the flat planar portion. First and second integrally molded, spaced rails lie on a third plane, wherein the third plane is intermediate the first and second planes.

22 Claims, 25 Drawing Sheets

U.S. PATENT DOCUMENTS

| | | | | | |
|---|---|---|---|---|---|
| 2,889,594 | A | * | 6/1959 | Feuerborn | 428/120 |
| 3,287,855 | A | * | 11/1966 | Hallonquist et al. | 49/503 |
| 4,236,365 | A | | 12/1980 | Wheeler | |
| 4,265,067 | A | | 5/1981 | Palmer | |
| 4,271,892 | A | * | 6/1981 | Brusseau et al. | 160/92 |
| 4,702,054 | A | | 10/1987 | Turner | |
| 4,743,509 | A | * | 5/1988 | Vladimiro | 428/425.1 |
| 4,756,350 | A | * | 7/1988 | Turner | 144/346 |
| 4,812,188 | A | * | 3/1989 | Hansen | 156/220 |
| 4,844,968 | A | | 7/1989 | Persson et al. | |
| 4,882,877 | A | * | 11/1989 | Guetle et al. | 49/506 |
| 5,022,206 | A | * | 6/1991 | Schield et al. | 52/455 |
| 5,074,087 | A | | 12/1991 | Green | |
| 5,540,026 | A | * | 7/1996 | Gartland | 52/455 |
| 5,887,402 | A | | 3/1999 | Ruggie et al. | |
| 6,073,419 | A | * | 6/2000 | Moyes | 52/784.1 |
| 6,079,183 | A | | 6/2000 | Moyes | |
| 6,312,540 | B1 | | 11/2001 | Moyes | |
| 6,389,768 | B1 | | 5/2002 | Gagne et al. | |
| 6,485,800 | B1 | | 11/2002 | Liittschwager et al. | |
| 6,487,827 | B2 | | 12/2002 | Hollman | |
| 6,602,610 | B2 | | 8/2003 | Smith et al. | |
| 7,137,232 | B2 | | 11/2006 | Lynch et al. | |
| 2002/0083649 | A1 | * | 7/2002 | Hollman | 49/504 |
| 2003/0066257 | A1 | | 4/2003 | Shovlin | |
| 2004/0074186 | A1 | | 4/2004 | Lynch et al. | |

FOREIGN PATENT DOCUMENTS

| | | |
|---|---|---|
| DE | 19721465 | 10/1998 |
| FR | 2514401 | 4/1983 |
| GB | 2289439 | 11/1995 |

* cited by examiner

DOOR SKIN, METHOD OF MANUFACTURING A DOOR PRODUCED THEREWITH, AND DOOR PRODUCED THEREFROM

CROSS-REFERENCE TO RELATED APPLICATION AND CLAIM TO PRIORITY

This application is a divisional of U.S. patent application Ser. No. 10/705,257, filed Nov. 12, 2003, now U.S. Pat. No. 7,284,352, which is a continuation-in-part of U.S. patent application Ser. No. 10/351,592, filed Jan. 27, 2003, now U.S. Pat. No. 7,370,454, which is a continuation-in part of U.S. patent application Ser. No. 10/291,756, filed Nov. 12, 2002, now U.S. Pat. No. 7,137,232, for Steven K. Lynch et al. The disclosures of which are incorporated herein by reference and priority to which is claimed.

FIELD OF THE INVENTION

The present invention relates to a door skin comprising an exterior side and an interior side for being secured to a frame member. First and second molded, spaced stiles lie on a first plane, and a flat planar portion disposed between the stiles lies on a second plane spaced from the first plane. A first interface portion is disposed between and contiguous with the stiles and the flat planar portion. In addition, first and second integral, molded spaced rails may lie on a third plane. The third plane is intermediate the first and second planes. A method of manufacturing a door having at least one of the disclosed door skins is also provided, and door produced therefrom.

BACKGROUND ON THE INVENTION

The formation of a molded door skin from a flat wood composite, and a hollow core door manufactured therewith, is known in the art. For example, see Moyes, U.S. Pat. No. 6,312,540 and Moyes, U.S. Pat. No. 6,079,183, the disclosures of which are incorporated herein by reference. The wood composite may be particleboard, flake board, hard board, or medium density fiberboard ("MDF"). The wood composites often utilize a resin binder, which frequently is a thermal setting resin, in order to maintain the wood fibers forming the composite in solid form.

Standard molded door skins are formed from a relatively thick non-solid mat or bat of material, which is thereafter compressed in a press to a relatively thin, final thickness. The mat is in a flexible state prior to the pressing operation, and the resulting solid skin may have sharply defined features because the wood fibers conform to the shape of the dies under heat and pressure. Standard molded door skins may provide contoured features desirable to consumers, but are relatively expensive to manufacture due to the tooling costs.

A flush door skin is one that is flat or planar on both major surfaces. Such skins are less expensive to manufacture than standard molded skins. A wood composite flush door skin blank may be transformed into a molded skin by post-forming the flush door skin, as disclosed in the above referenced patents to Moyes. Thus, contoured features may be achieved using a flat blank by subsequently post-forming the blank to a desired contour.

A molded door skin may include features simulating stiles, rails and panels. Such features are desirable to consumers. Contoured features and wood grain textures may be pressed into the blank during compression. However, a different die set is required for different panel and door configurations. For example, the die set used to form a molded door skin having two simulated panels between the stiles may not be used to form a molded door skin having three or more simulated panels between the stiles. In addition, a new die set is required for different length door skins, even if the panel configuration is similar, given the panel dimensions are different.

With conventional molded door skins, the veneers and overlays applied to such skins do not provide an appearance of having separate stiles and rails. This is because the pattern of the veneer or overlay, such as a paper overlay, foil, or the like, is oriented in one direction on the entire visible surface of the door skin. In that event, the wood grain pattern runs parallel to the stiles, but perpendicular to the rails because the rails and stiles are oriented at a 90° angle. Therefore, the door does not present an appearance of being a solid hardwood door having separate stiles and rails, which is desirable to consumers.

In an attempt to overcome this problem, some methods provide for positioning separate pieces of veneer or paper overlay, so that the pattern on the veneer or overlay may be oriented as desired. For example, pieces of veneer corresponding to the size of the rails are positioned on the blank at positions corresponding to the rails. However, the overlays must be carefully aligned, thereby increasing time and cost in door manufacture. Furthermore, even if the overlay is properly aligned, the overlay may not be secured onto the blank consistently. In addition, a specific die set for molding the blanks is required for each door skin configuration.

In one attempt to provide a door having an appearance of separate stiles and rails, a groove is routed from a main panel, forming stiles and a raised infill panel. Rails are then secured to receiving surfaces adjacent the simulated raised infill panel. Although the appearance of the door produced therefrom is improved, it is not cost efficient. The rails are positioned on predetermined receiving surfaces adjacent the raised infill panel. Therefore, any variations in panel configuration require that a new blank and routing pattern be utilized. If the main panel is molded, multiple die sets are again required for multiple panel configurations. Therefore, such a method does not solve the manufacturing and inventory problems noted above.

Therefore, it is an object of the present invention to provide a universal door skin blank that is inexpensive to manufacture, and that solves the above noted problems. It is a further object of the present invention to provide a universal door skin blank that may be used for various panel and/or rail configurations.

SUMMARY OF THE INVENTION

A door skin comprises an exterior side and an interior side for being secured to a frame member. First and second molded, spaced stiles lie on a first plane. A flat planar portion disposed between the stiles lies on a second plane spaced from the first plane. A first interface portion is disposed between and contiguous with the stiles and the flat planar portion.

A door comprises a peripheral frame having oppositely disposed sides and first and second door skins. Each one of the skins has an exterior side and an interior side for being secured to a frame member. First and second molded, spaced stiles lie on a first plane. First and second molded, spaced rails lie on a second plane. A flat planar portion is disposed between the stiles and the rails, and lies on a third plane. A first interface portion is disposed between and contiguous with the stiles and the flat planar portion. A second interface portion is disposed between and contiguous with the rails and the flat planar portion. Edge portions are disposed between and contiguous with the rails and the stiles.

In another embodiment, a door comprises a peripheral frame having oppositely disposed sides and first and second door skins. Each one of the skins has an exterior side and an interior side secured to one of the frame sides. At least one of the skins is formed to have spaced stiles lying on a first plane and a planar portion disposed between the stiles and lying on a plane spaced from the plane of the stiles. At least two separately formed rails are secured to the planar portion at opposite ends thereof.

A method of producing a door comprises the steps of: providing a peripheral door frame having oppositely disposed sides; providing first and second wood composite blanks having an exterior side and an interior side; forming at least one of the blanks to have spaced stiles lying on a first plane, spaced rails lying on a second plane, and a planar portion disposed between the stiles and the rails and lying on a third plane, a first interface portion disposed between and contiguous with the stiles and the planar portion, a second interface portion disposed between and contiguous with the rails and the planar portion, and edge portions disposed between and contiguous with the rails and the stiles; and securing the interior sides of the formed blanks to one of the frame sides.

In another embodiment, a method of producing a door comprises the steps of: providing a peripheral door frame having oppositely disposed sides; providing first and second wood composite blanks having an exterior side and an interior side; forming at least one of the blanks to have spaced stiles, a planar portion disposed between the stiles and lying on a plane spaced from the plane of the stiles, and an interface portion disposed between and contiguous with the stiles and the planar portion; securing the interior sides of the formed blanks to one of the frame sides; forming at least two rails, each one of the rails having an exterior surface and an interior surface; and securing the interior surface of the rails onto the planar portion.

A method of producing a door skin blank comprises the steps of: providing a die set having an upper die spaced from a lower die, the dies creating a forming chamber defining first and second spaced stiles lying on a first plane, and a planar portion lying on a second plane spaced from the first plane and the planar portion being integral with and disposed between the stiles; disposing a substrate between the upper and lower dies; and compressing the substrate using heat and pressure to form a blank having spaced stiles lying on a first plane, spaced rails lying on a second plane, and a planar portion disposed between the stiles and the rails and lying on a third plane, a first interface portion disposed between and contiguous with the stiles and the planar portion, a second interface portion disposed between and contiguous with the rails and the planar portion, and edge portions disposed between and contiguous with the rails and the stiles.

DETAILED DESCRIPTION OF THE INVENTION

Figure 1:
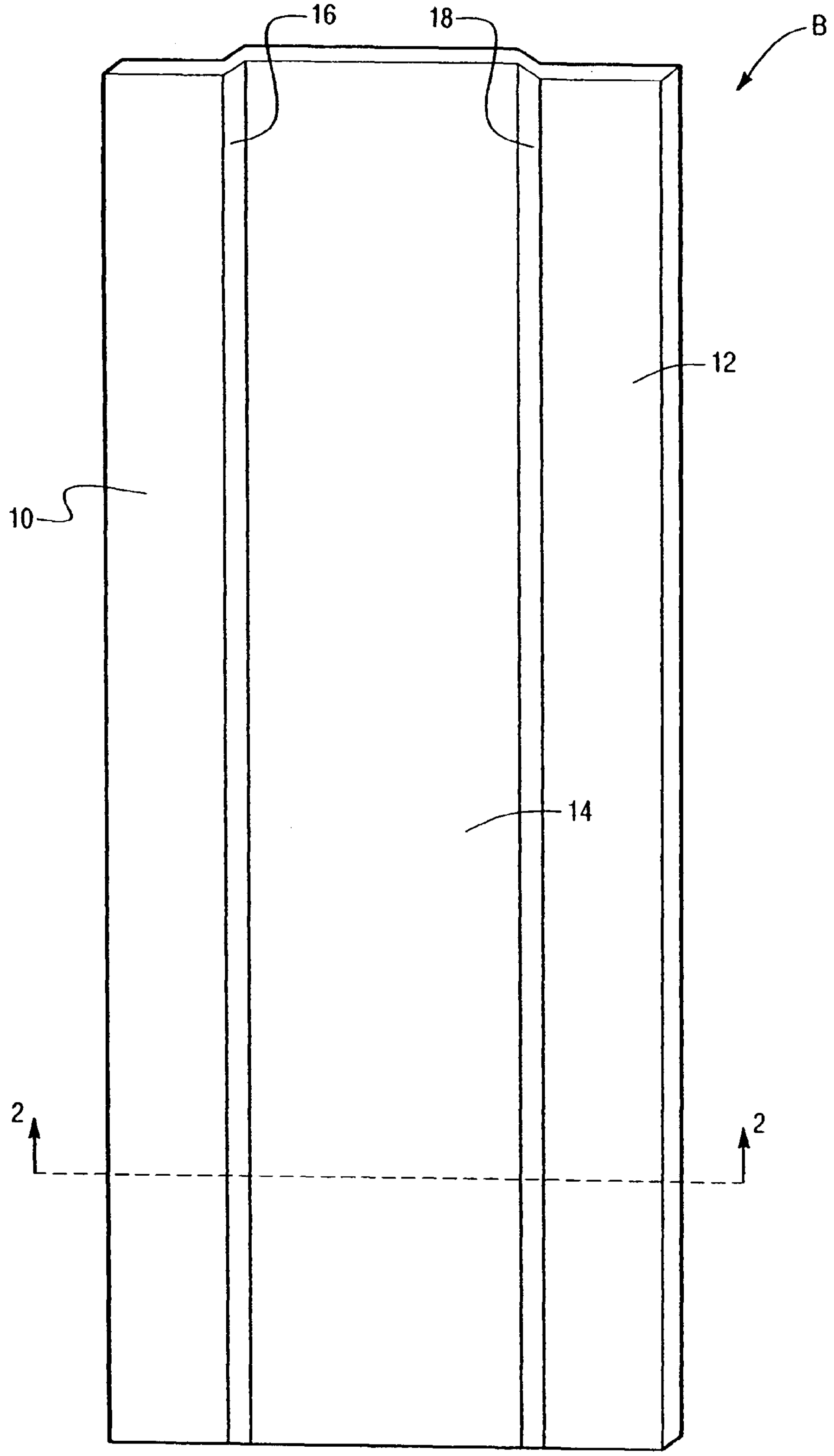
FIG. 1 is an elevational view of a universal door skin blank according to the present invention.
Figure 2:
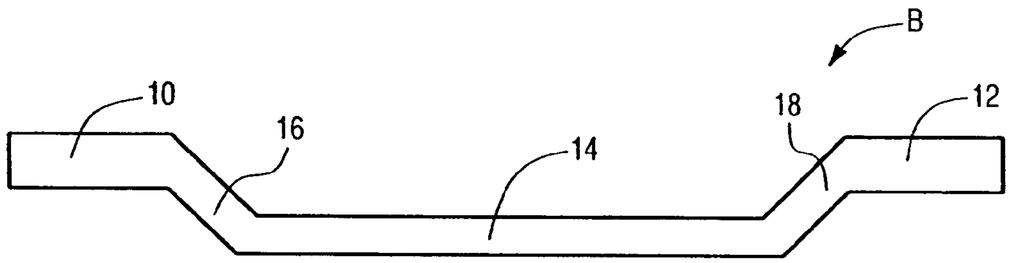
FIG. 2 is a cross-sectional view taken along the line 2-2 of FIG. 1 and viewed in the direction of the arrows.

As best shown in FIGS. 1-2, a universal door skin blank B is formed to have oppositely disposed molded stiles 10, 12 lying on a first plane, and a flat planar portion 14 disposed between and integral with stiles 10, 12 and lying on a plane spaced from the plane of stiles 10, 12. Preferably, stiles 10, 12 are parallel and coplanar, and extend along the opposing sides of blank B. A standard width of stiles 10, 12 is about 152.4 millimeters (or about 6 inches). Planar portion 14 extends the entire length of stiles 10, 12, and maintains a substantially constant width between stiles 10, 12 the entire length of blank B.

Preferably, planar portion 14 is recessed relative to stiles 10, 12 by about 6 to 9 millimeters, though any desired spacing between the plane of stiles 10, 12 and the plane of planar portion 14 may be formed. Blank B may be post-formed from a solid composite wood blank, such as an MDF blank. Alternatively, blank B may be formed from a non-solid bat of material, as known in the art. Any known method of forming blank B may be utilized, so long as blank B is formed to have spaced stiles 10, 12 and planar portion 14, as described herein. Additionally, blank B may be fiberglass, thermoplastic, or any other suitable material.

An interface 16 is disposed between and contiguous with stile 10 and planar portion 14, as best shown in FIGS. 1-2. Likewise, an interface 18 is disposed between and contiguous with stile 12 and planar portion 14. Interfaces 16, 18 preferably extend at an angle of 45° relative to the plane of planar portion 14. However, it is understood that interfaces 16, 18 may be formed to extend at any desired angle during formation of blank B.

Figure 3:
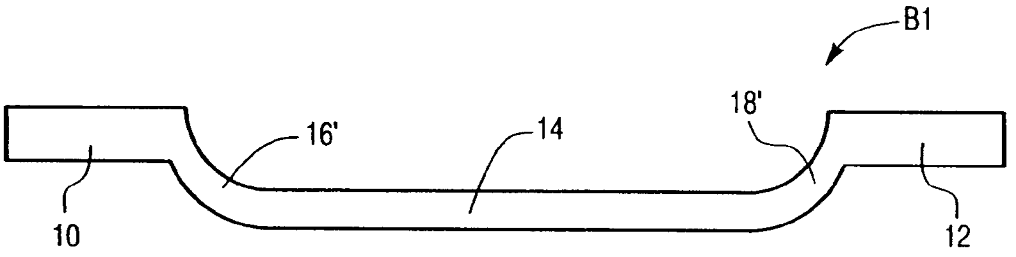
FIG. 3 is a cross-sectional view similar to FIG. 2 showing a second embodiment of the interface portion between the stiles and planar portion.
Figure 4:
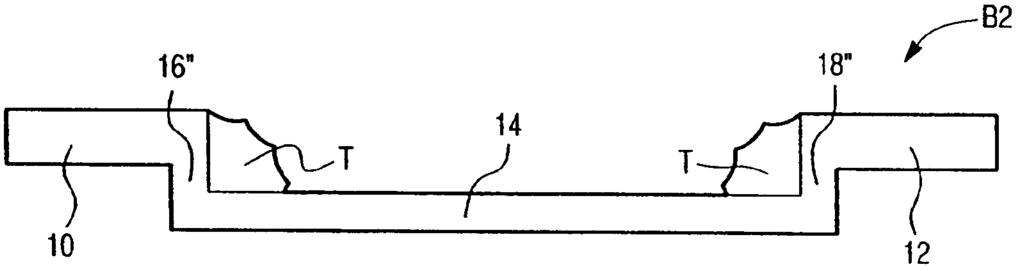
FIG. 4 is a cross-sectional view similar to FIG. 2 showing a third embodiment of the interface portion between the stiles and planar portion.

Interfaces 16, 18 may include a contoured design, such as a curved portion or descending step portion disposed between stiles 10, 12 and planar portion 14, respectively. For example, blank B1 may be formed to have curved interfaces 16' and 18', as best shown in FIG. 3. Alternatively, blank B2 may be formed to have interfaces 16" and 18" extending at an angle of 90° relative to the plane of planar portion 14, as best shown in FIG. 4. Note that identical features are numbered accordingly. Therefore, interfaces 16", 18" are perpendicular to planar portion 14 as well as to stiles 10, 12. This configuration may be advantageous if a decorative mold trim T or bond trim is secured to interfaces 16", 18", and mold trim T has an L-shaped surface for securing to planar portion 14 and interfaces 16", 18", as best shown in FIG. 4. Of course, trim T may be secured to interfaces 16, 18 or 16', 18', depending on the configuration of trim T. Additionally, trim T may extend either above or below the plane of stiles 10, 12, depending on the configuration of trim T and consumer preference.

Figure 5:
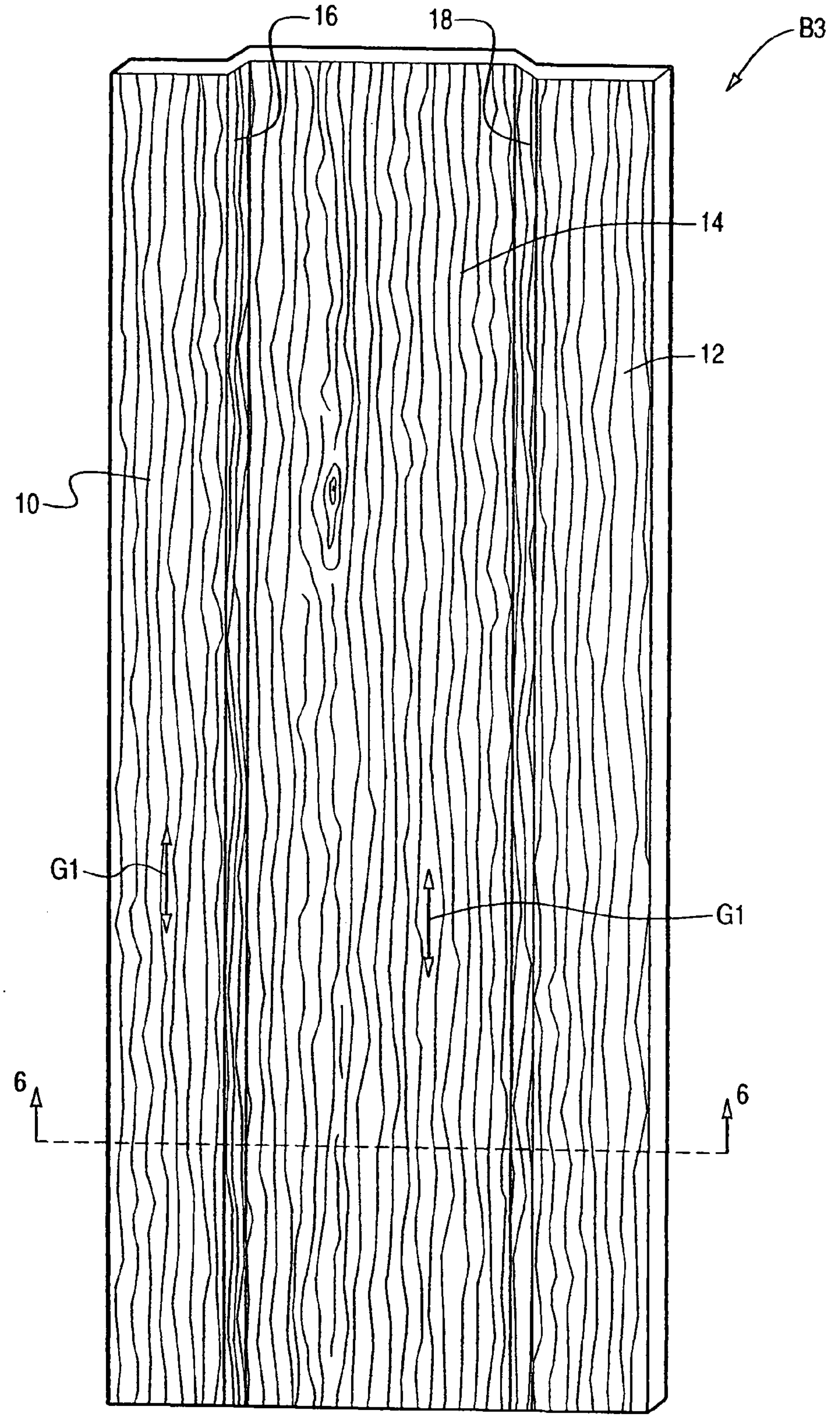
FIG. 5 is an elevational view of a universal door skin blank having a decorative layer according to the present invention.
Figure 6:
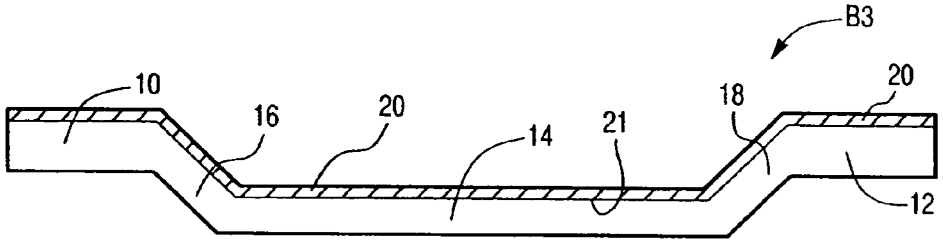
FIG. 6 is a cross-sectional view taken along the line 6-6 of FIG. 5 and viewed in the direction of the arrows.

As best shown in FIGS. 5-6, blank B3 may include a decorative layer 20, such as a veneer, foil, paper overlay, or the like. Decorative layer 20 may be finished or unfinished, or otherwise patterned. Decorative layer 20 is secured to surface 21 which is to be exteriorly disposed of blank B3, as best shown in FIG. 6. Preferably, decorative layer 20 is compressed onto and secured to blank B3 during formation of blank B. For example, decorative layer 20 may be bonded to an MDF blank during post-form compression. We have found that decorative layer 20 should be adhesively secured to blank B3, preferably through the use of a thermally activated adhesive or resin applied to exterior surface 21 of blank B3, the decorative layer 20, or incorporated into decorative layer 20. Therefore, decorative layer 20 may be bonded to blank B3 at the same time blank B3 is being molded into the desired contour. If a veneer is used, a layer of adhesive is applied to either the veneer surface to be bonded, or the surface 21 of blank B3 to be secured to the veneer. Similarly, if a paper overlay is used, a layer of adhesive may be applied to either the surface of the paper overlay to be bonded or to the surface 21 of blank B3. Alternatively, resin impregnated paper may be used.

Decorative layer 20 preferably has a wood grain pattern and characteristics running parallel to stiles 10, 12, as best shown in FIG. 5 by arrows G1. However, it is understood that decorative layer 20 may have any desired pattern or texture. It should also be understood that blank B need not have any decorative layer 20, as best shown in FIG. 1. For example, a high quality blank B may be used which is painted or colored after formation. Therefore, decorative layer 20 is optional. In addition, a die set may include an embossed or textured pattern in the die molds, producing a blank having a textured surface ingrained directly into the wood composite material, instead of using decorative layer 20.

Figure 8:
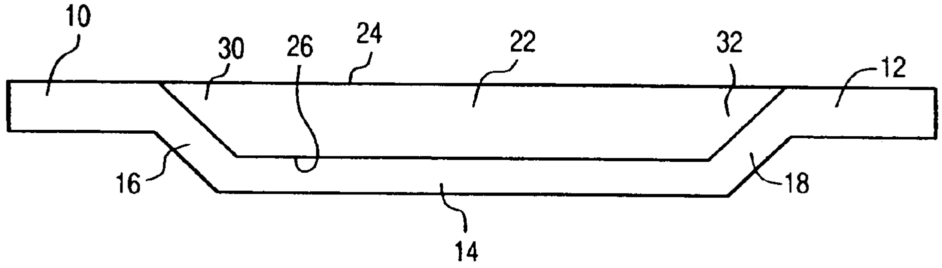
FIG. 8 is a cross-sectional view taken along the line 8-8 of FIG. 7 and viewed in the direction of the arrows.
Figure 7:
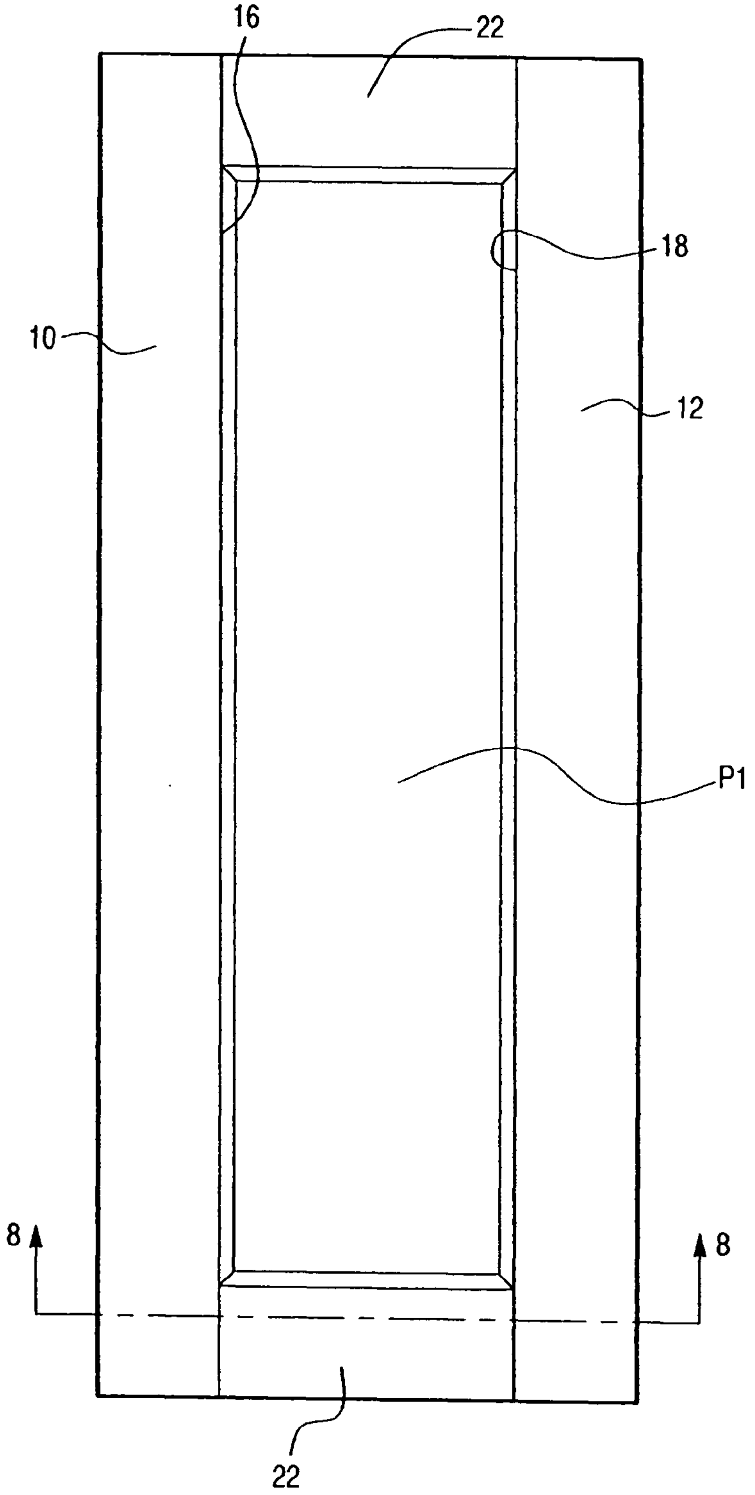
FIG. 7 is an elevational view of a universal door skin blank with rails secured thereon according to the present invention.

As best shown in FIGS. 7 and 8, at least two rails 22 may be secured to blank B at opposite ends of planar portion 14. Rails 22 are separately formed, and may be post-formed MDF, solid wood cut to the desired size and shape, or a molded wood composite formed to the desired size and shape. Each one of rails 22 has an exterior major surface 24, and an interior major surface 26 for being secured to planar portion 14, as best shown in FIG. 8. Each one of rails 22 further comprise oppositely disposed angled ends 30, 32. Angled ends 30, 32 are complementary to and form a fit with interfaces 16, 18, respectively. Therefore, if interfaces 16, 18 are formed at an angle of 45°, angled ends 30, 32 are also formed at an angle of 45°, so that rails 22 are precisely secured to planar portion 14 and interfaces 16, 18. In addition, it is easier to form a fit between interfaces 16, 18 and angled ends 30, 32 with an angle of 45°.

A conventional bead and cove configuration of a door having separately formed rails requires precise alignment of the interface at which rails are secured. In the present invention, the 45° angle of angled ends 30, 32 ensures a secure fit, even if exterior surface 24 of rail 22 is not flush with stiles 10, 12. Angled ends 30, 32 are formed to have an inverse configuration relative to interfaces 16, 18, respectively. Although exterior surface 24 of rail 22 is preferably flush and coplanar with stiles 10, 12, as shown in FIG. 8. It is understood that exterior surface 24 may also be recessed, or positioned slightly above stiles 10, 12. It may be preferred by the customer that rails 22 be slightly recessed. Preferably, rails 22 are adhesively secured to planar portion 14.

Figure 9:
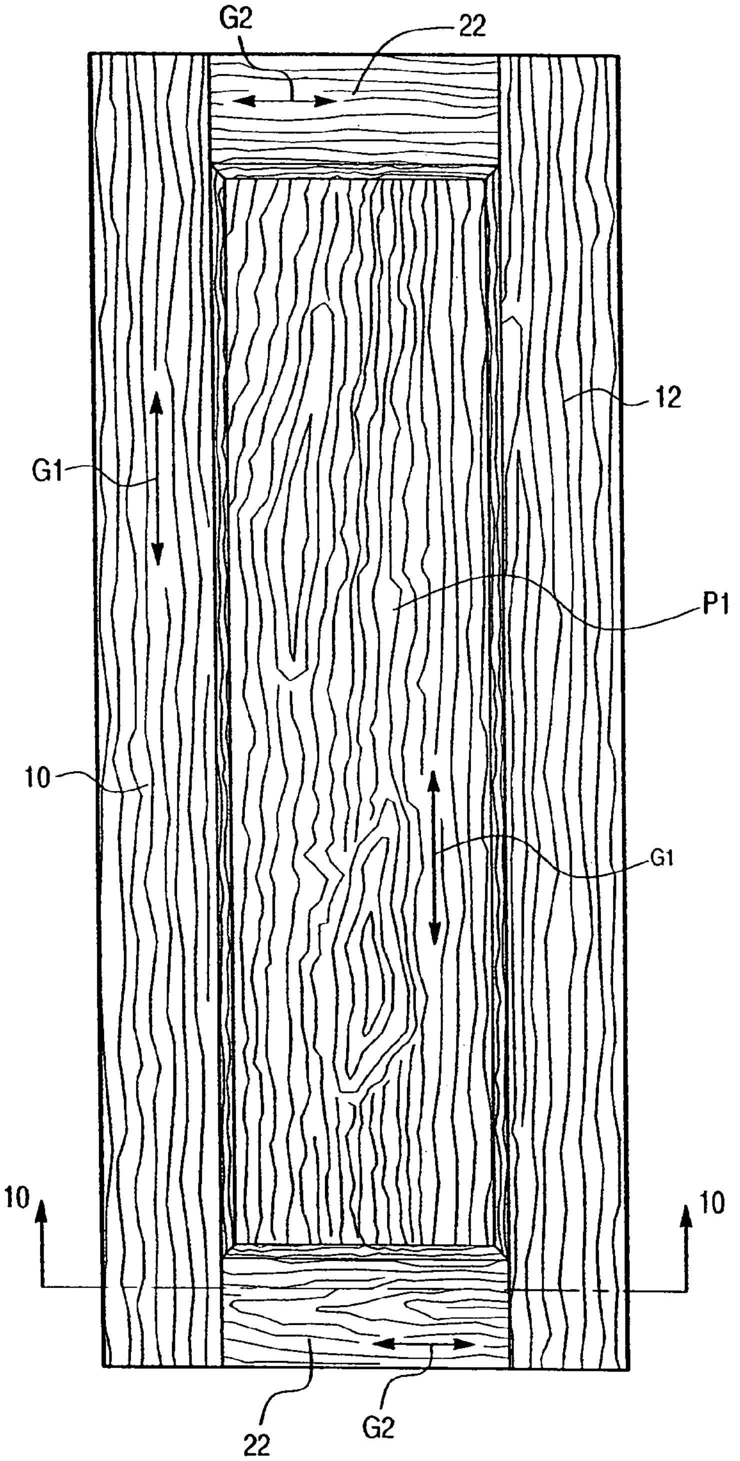
FIG. 9 is an elevational view of a universal door skin blank having a decorative layer and with rails secured thereon according to the present invention.
Figure 10:
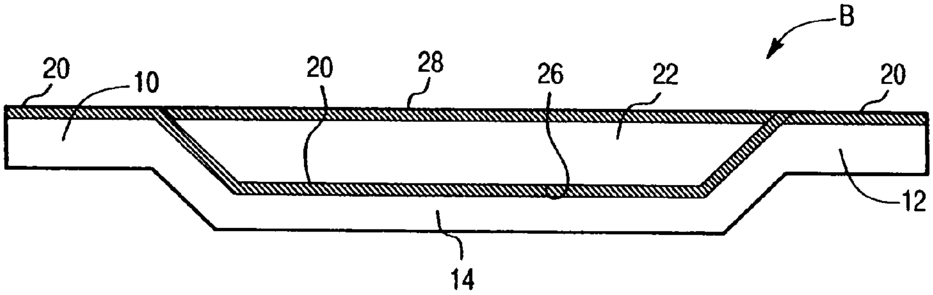
FIG. 10 is a cross-sectional view taken along line 10-10 of FIG. 9 and viewed in the direction of the arrows.

A decorative layer 28 may also be secured to rails 22, as best shown in FIGS. 9 and 10. Preferably, decorative layer 28 has the same pattern as decorative layer 20. However, the pattern or species covering rails 22 may differ from the pattern or species covering blank B. The grain of decorative layer 28 runs parallel to rails 22, as best shown by arrows G2 in FIG. 9. The grain of decorative layer 20 runs parallel to stiles 10, 12. Therefore, the orientation and characteristics of the wood grain pattern of decorative layer 20 on stiles 10, 12 is perpendicular to the orientation and characteristics of the wood grain pattern of decorative layer 28 on rails 22, as best shown by arrows G1 and G2 in FIG. 9.

Interior major surface 26 of rails 22 may be secured directly to decorative layer 20, as best shown in FIG. 10. Preferably, rails 22 are secured to decorative layer 20 covering planar portion 14 so that decorative layer 28 on rails 22 is flush and coplanar with decorative layer 20 covering stiles 10, 12. However, it is to be understood that rails 22 may also be recessed from stiles 10, 12.

Universal door skin blank B may be formed to any desired length, and subsequently cut to a desired size. Hence, a single blank may be used for doors of essentially any size. Alternatively, because of the uniform shape of blank B, the dies of the mold can accommodate a blank having a length less than the corresponding length of the dies. After blank B is cut to size, rails 22 may be secured to planar portion 14, simulating a panel P1 disposed between stiles 10, 12, as best shown in FIGS. 7 and 9. The length of P1 is therefore variable, depending on where rails 22 are secured on planar portion 14 of blank B. Because planar portion 14 extends the entire length of blank B, and maintains its width the entire length of blank B, rails 22 may be positioned as desired, and are not confined to specific receiving surfaces as in some prior art designs. In this way, manufacturing and inventory costs are greatly reduced because only one mold die set is required for each width of universal door skin blank B, which may thereafter be transformed into various panel configurations or lengths by securing two or more rails as described herein. The necessity of a separate die set for each length blank B is eliminated. Although the width of blank B is predetermined during formation, other features, such as length and rail placement, may be achieved by modification of blank B.

Figure 12:
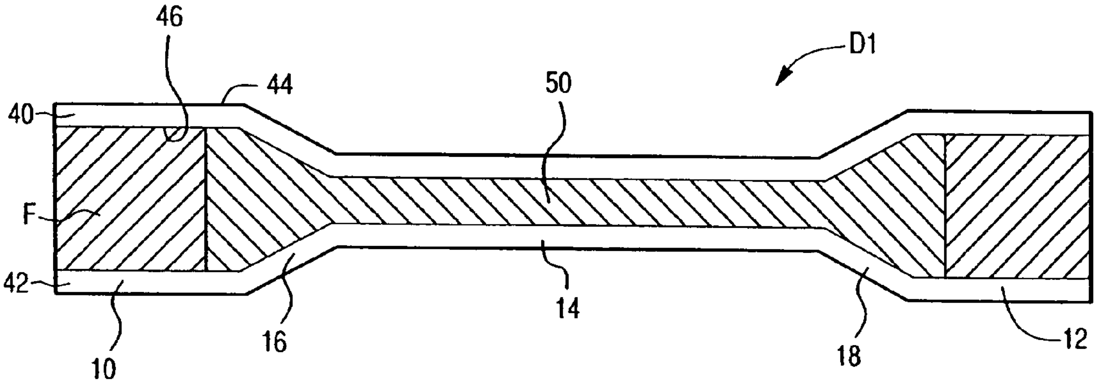
FIG. 12 is a cross-sectional view taken along line 12-12 of FIG. 11 and viewed in the direction of the arrows.
Figure 11:
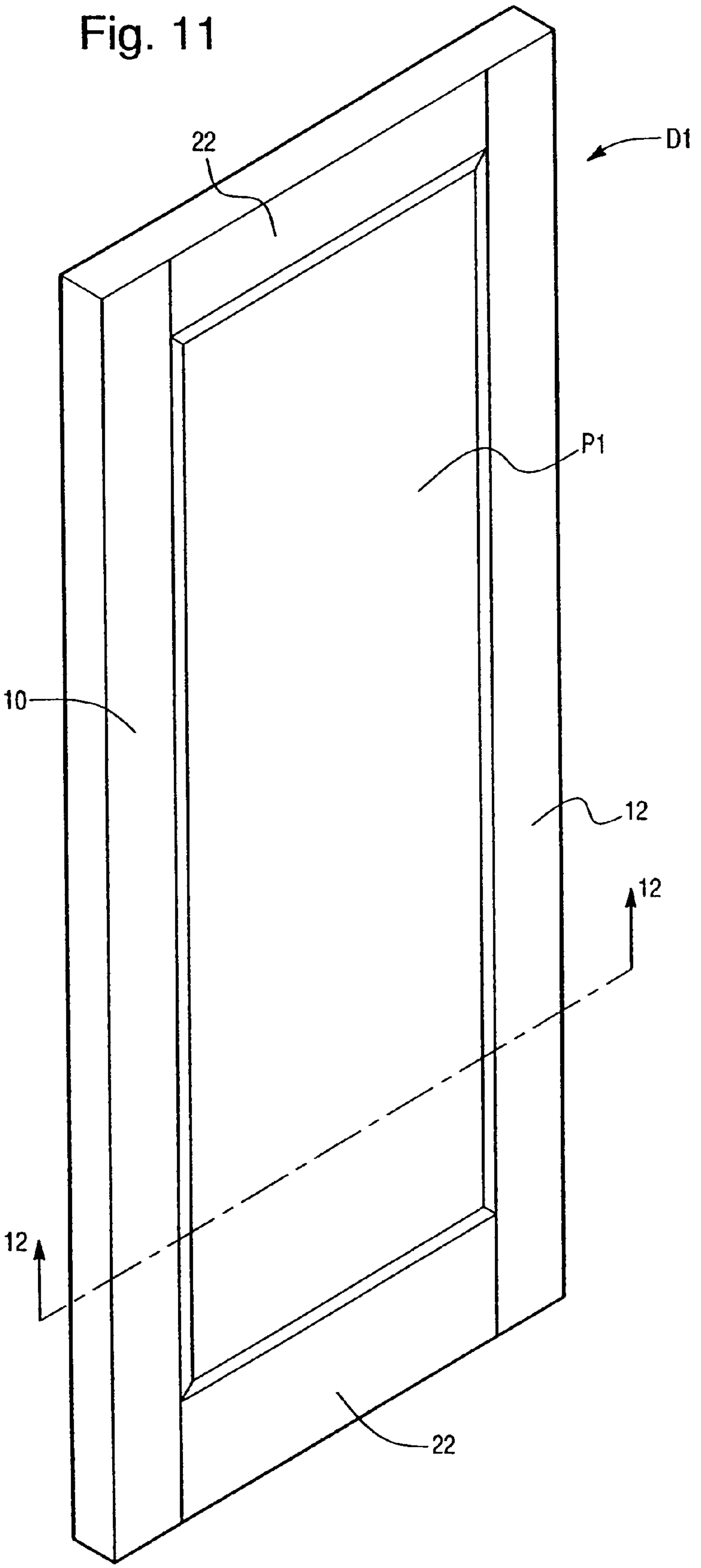
FIG. 11 is a perspective view of a door having two rails.
Figure 13:
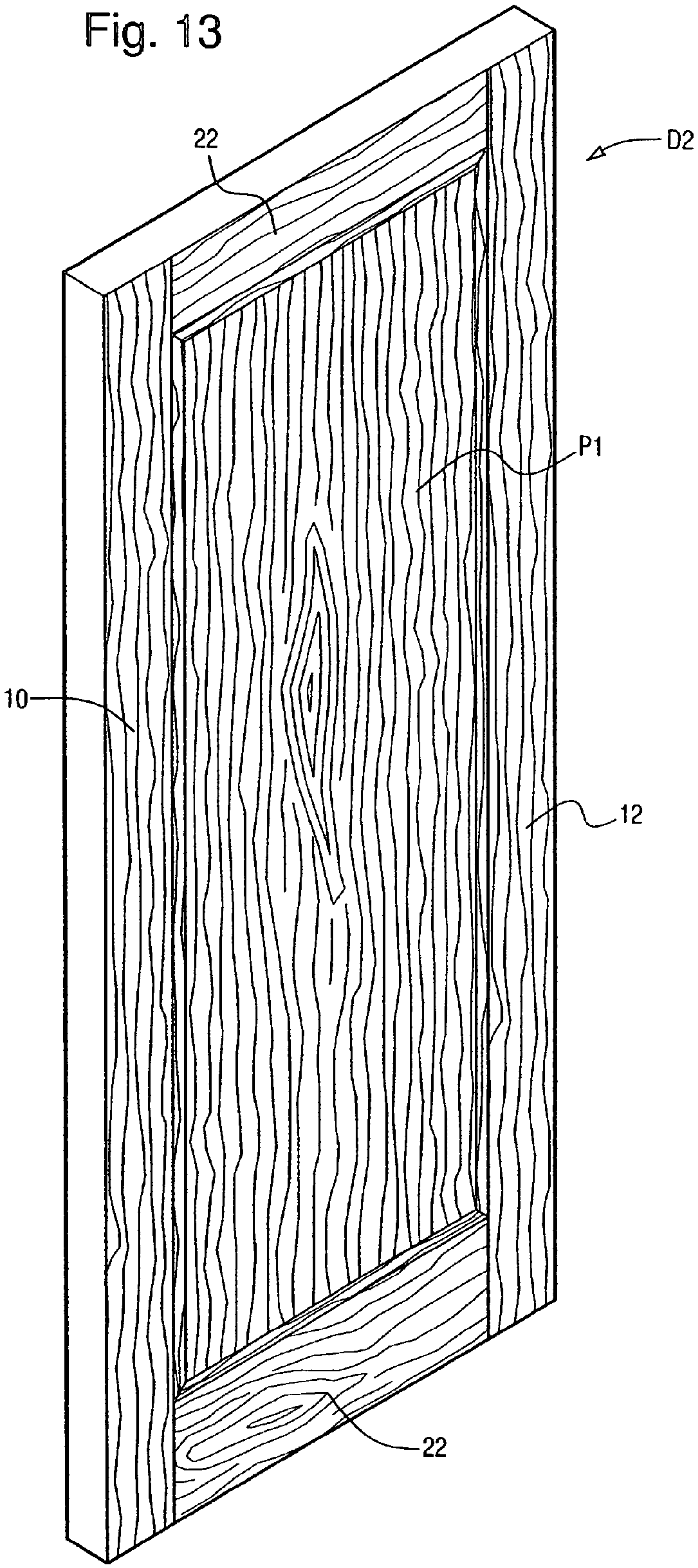
FIG. 13 is a perspective view of a door having a decorative layer and having two rails.

As best shown in FIGS. 11-12, door D1 includes a peripheral frame F, preferably formed of wood, having oppositely disposed sides, as known in the art. First and second door skins 40, 42 are provided. Each skin has an exterior side 44 and an interior side 46. Each one of interior sides 46 is adhesively secured to a corresponding side of frame F, such as through the use of polyvinyl acetate or the like. At least one of door skins 40, 42 is formed to have spaced stiles 10, 12 and planar portion 14, as described above. Rails 22 simulate a panel P1. Door D1 may have identical door skins 40, 42 secured to the opposing sides of the frame F, as best shown in FIG. 12. As known in the art, a filler 50 or honeycomb material may be disposed between the first and second skins 40, 42, or the door may have a solid core. It is to be understood that decorative layers 20, 28 may also be included on at least one of skins 40, 42, to form door D2 having a wood grain pattern, as best shown in FIG. 13. Alternatively, a textured pattern may be molded into the wood composite forming blank B, thereby eliminating the need for decorative layer 20.

Any number of door configurations may be achieved with universal door skin blank B (or B1-B3). After blank B is formed, any number or configuration of rails 22 may be secured to planar portion 14 (or decorative layer 20). Therefore, only one die set for blank B is necessary, reducing manufacturing and inventory costs. Pursuant to consumer preference, universal door skin blank B may be cut to size and rails 22 quickly secured. Thus, a wide range of door configurations and lengths are achieved with one mold for blank B, thereby eliminating the expense of multiple die sets for each configuration.

Figure 14:
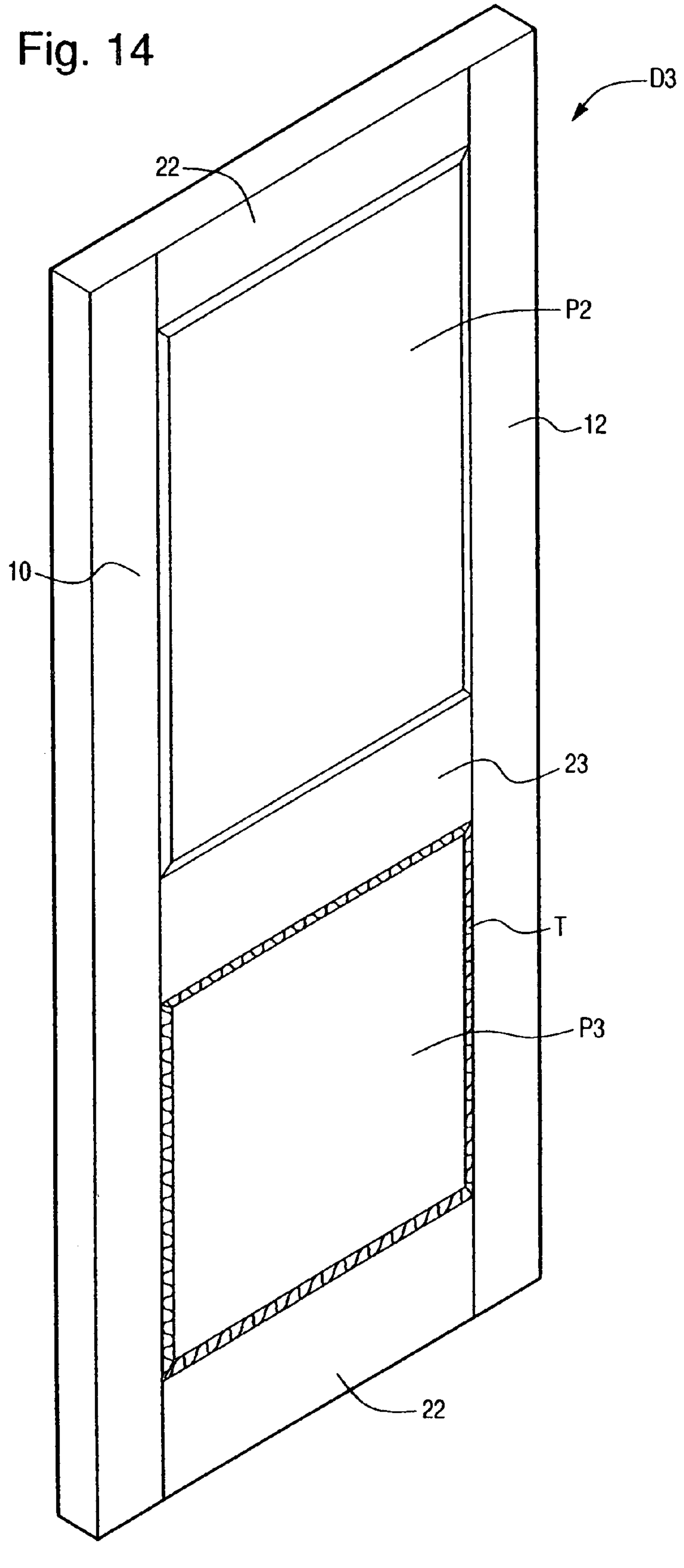
FIG. 14 is a perspective view of a door having three rails.

For example, doors D1 and D2 include two rails 22 secured at opposite ends of planar portion 14 to provide a one-panel door simulation, as best shown in FIGS. 11 and 13. As best shown in FIG. 14, door D3 includes rails 22 at opposite ends of planar portion 14, and an intermediate rail 23, which is secured to planar portion 14, thus simulating two panels P2 and P3, respectively. It is to be understood by one skilled in the art that any number of rails 22 may be secured to planar portion 14, or decorative layer 20 as described above. Moreover, it is to be understood that intermediate rail 23, which may have the same size and configuration of rails 22, may be secured anywhere desired on planar portion 14 pursuant to customer choice, thereby varying the size of panels P2 and P3. Rails 22, 23 may be positioned anywhere on planar portion 14, because planar portion 14 extends the entire width between stiles 10, 12 and length of blank B. Because there is no raised infill panel, blank B may be utilized regardless of the design chosen. Mold trim T may also be secured to interfaces 16, 18 (or 26", 28") surrounding P2 and/or P3, as best shown in FIG. 14.

Figure 15:
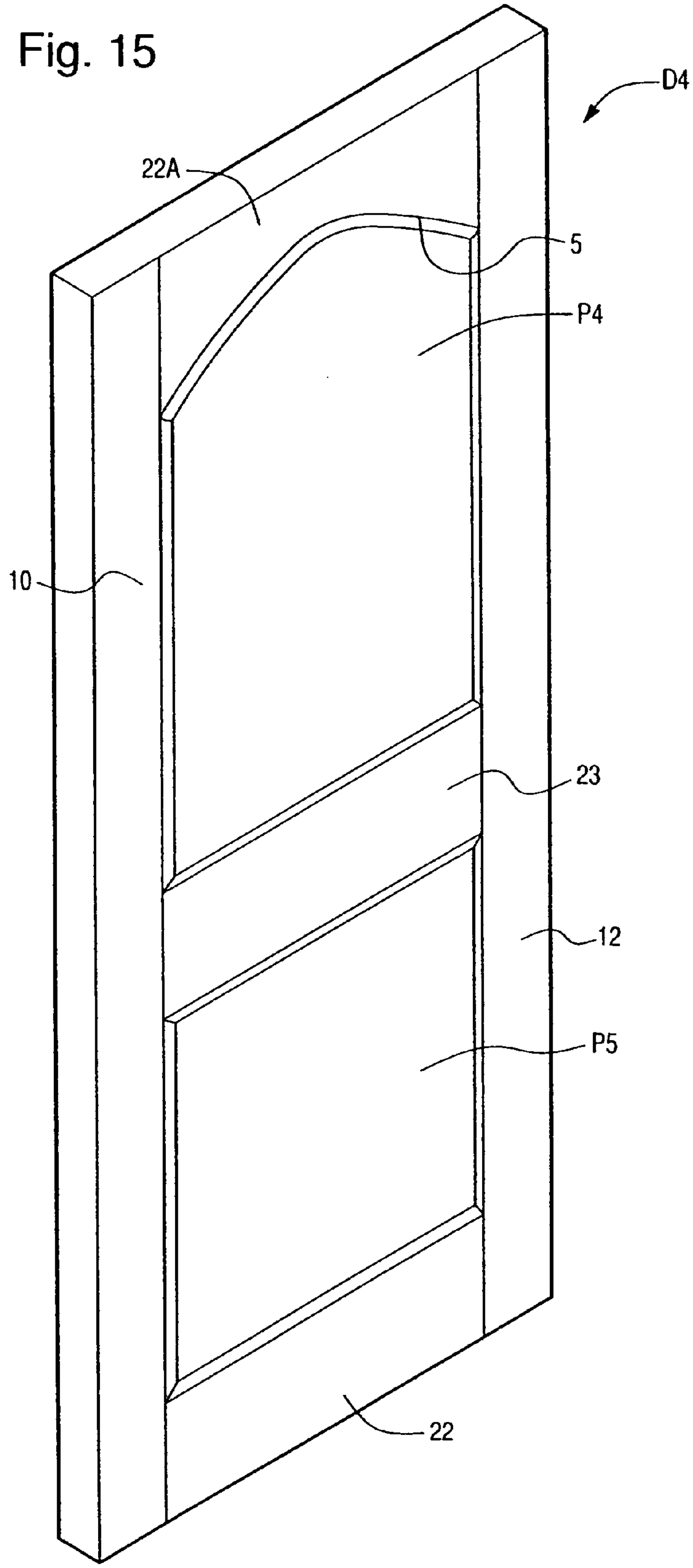
FIG. 15 is a perspective view of a door having a curved rail.
Figure 16:
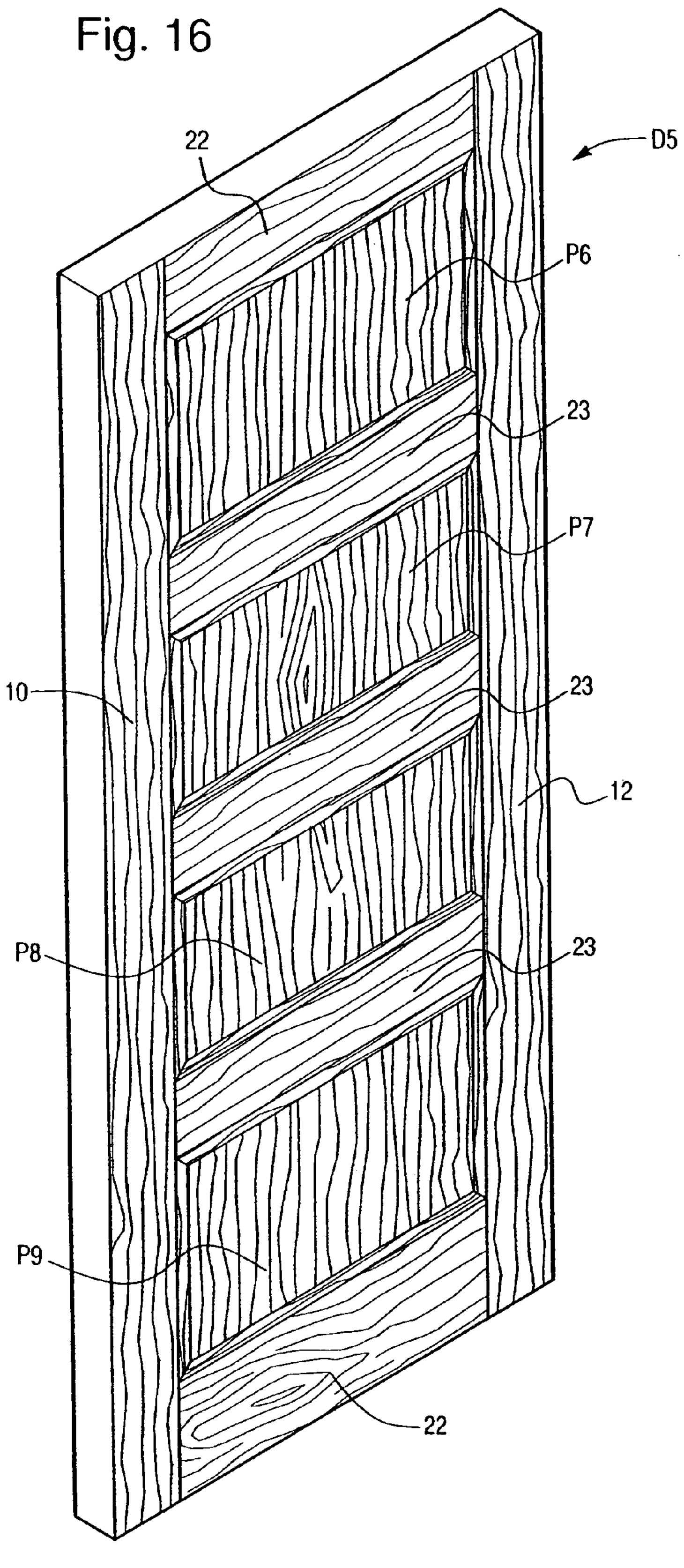
FIG. 16 is a perspective view of a door having five rails.

In another configuration, door D4 includes a curved upper rail 22A secured to planar portion 14, one rail 22, and intermediate rail 23, as best shown in FIG. 15. Curved rail 22A includes a curved side 5 extending from opposite ends. Because planar portion 14 is flat, rails 22, 23 and/or 22A may be positioned and configured as desired. Rails 22, 22A and 23 are secured to simulate two panels, P4 and P5. However, it should be understood that any number of panels may be simulated by securing additional rails 22 to planar portion 14. For example, door D5 includes rails 22 at opposite ends of planar portion 14, and three intermediate rails 23, as best shown in FIG. 16. Rails 22 and intermediate rails 23 simulate four panels P6, P7, P8, and P9.

Prior art methods including a raised infill panel and predefined receiving surfaces limit the configuration and shape of the rails used. In the present invention, the mold producing blank B may be used for various door configurations and lengths.

Figure 17:
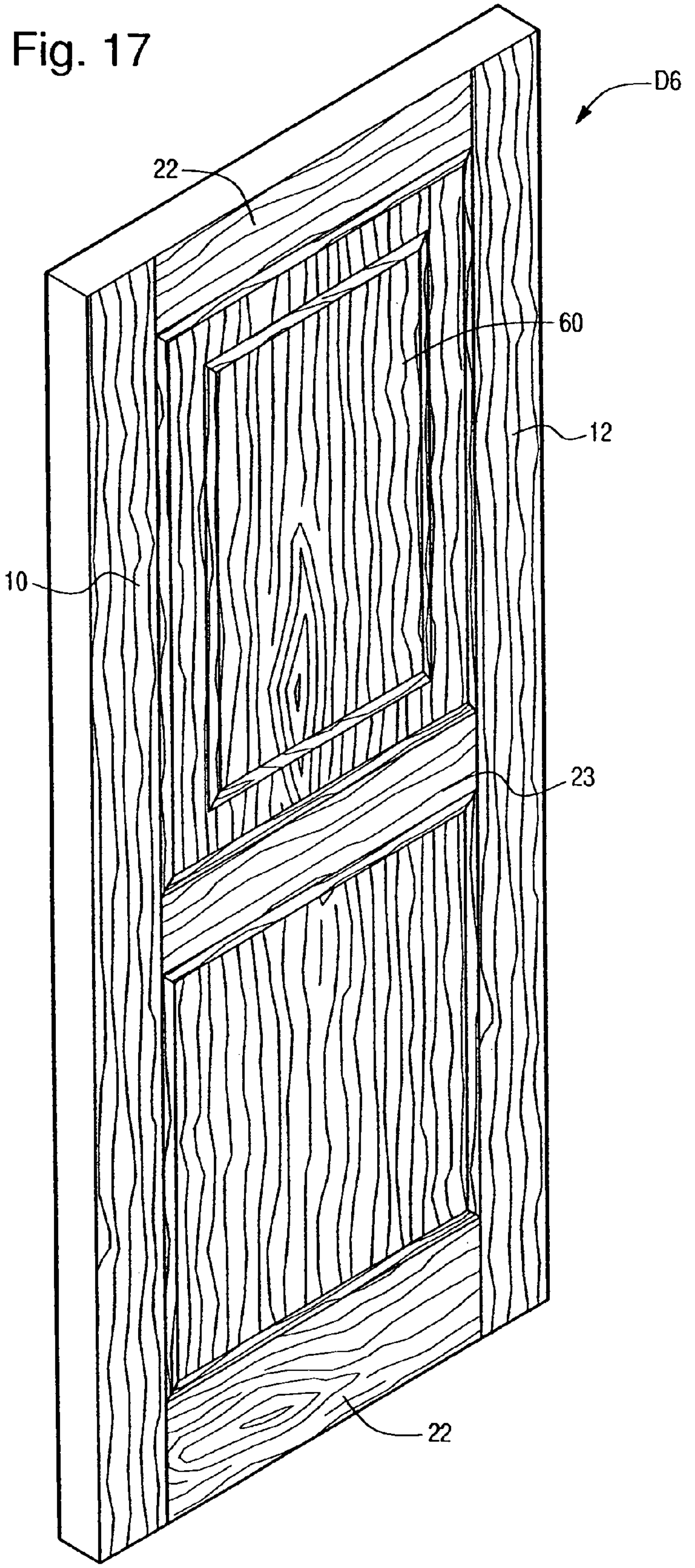
FIG. 17 is a perspective view of a door having three rails and a panel.

In another embodiment of the present invention, door D6 includes at least one panel 60 adhesively secured to decorative layer 20 covering planar portion 14 (or directly to planar portion 14, as noted above), as best shown in FIG. 17. Panel 60 may have a decorative layer or pattern, as described for rails 22, or have a plain appearance if desired by the consumer. If a wood grain pattern is desired on panel 60, the pattern may be oriented as desired. Thus, the orientation of the wood grain pattern on panel 60 may be different than the orientation of the wood grain 20, 28 on stiles 10, 12 and/or rails 22, or panel 60 may simply have a plain surface. The panel 60 may alternatively be a decorative element, such as a logo, design, or like desired pattern applied to planar portion 14, either with decorative layer 20 or some other decorative medium.

Figure 18:
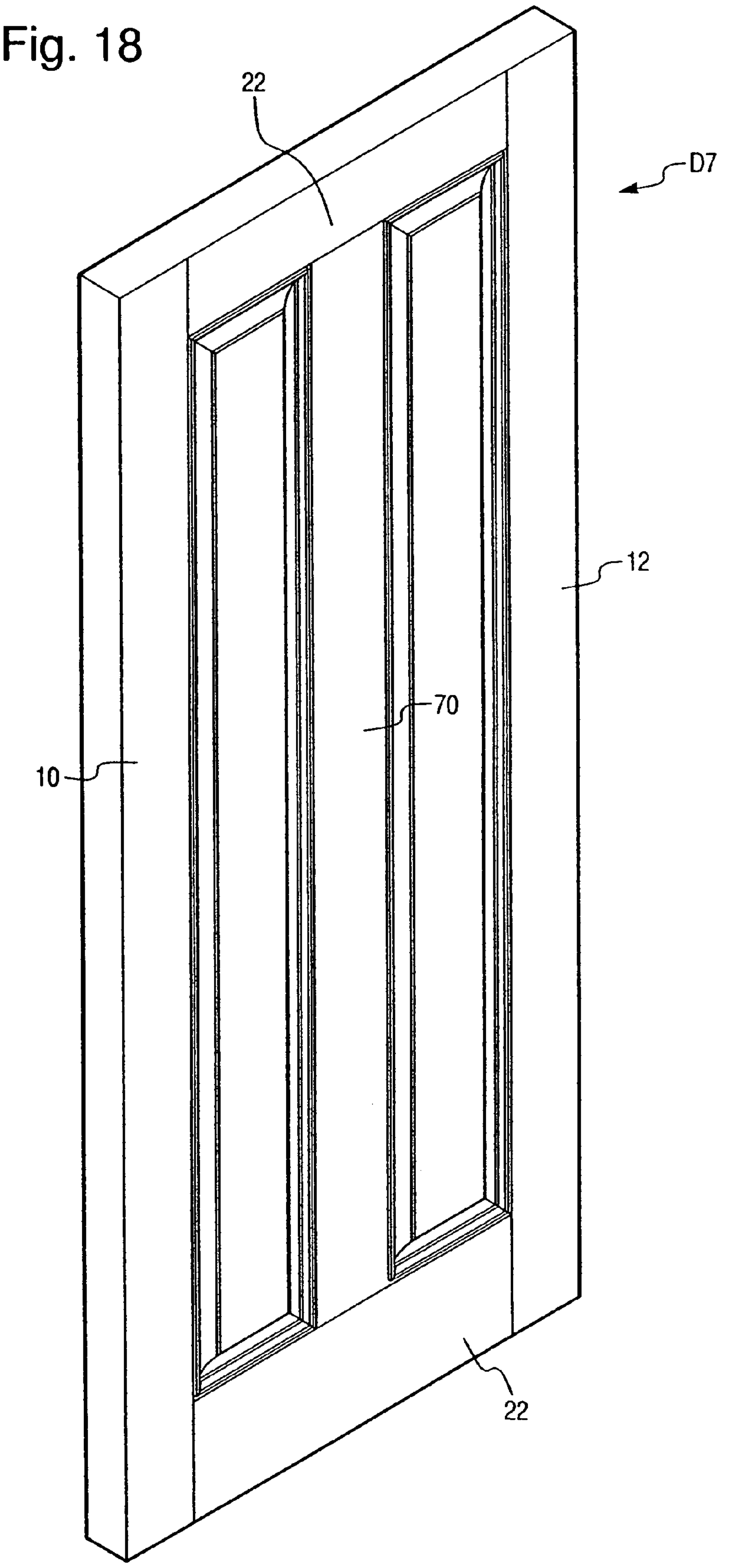
FIG. 18 is a perspective view of a door having two rails and an intermediate stile.

As best shown in FIG. 18, door D7 includes rails 22 secured to opposite ends of planar portion 14, and intermediate stile 70. Similar to panel 60, intermediate stile 70 may be adhesively secured to planar portion 14 (or decorative layer 20 covering planar portion 14), and extends parallel to, and intermediate from, stiles 10, 12. Thus, intermediate stile 70 simulates a third stile. Intermediate stile 70 may also include a decorative layer or pattern, as described above.

Figure 19:
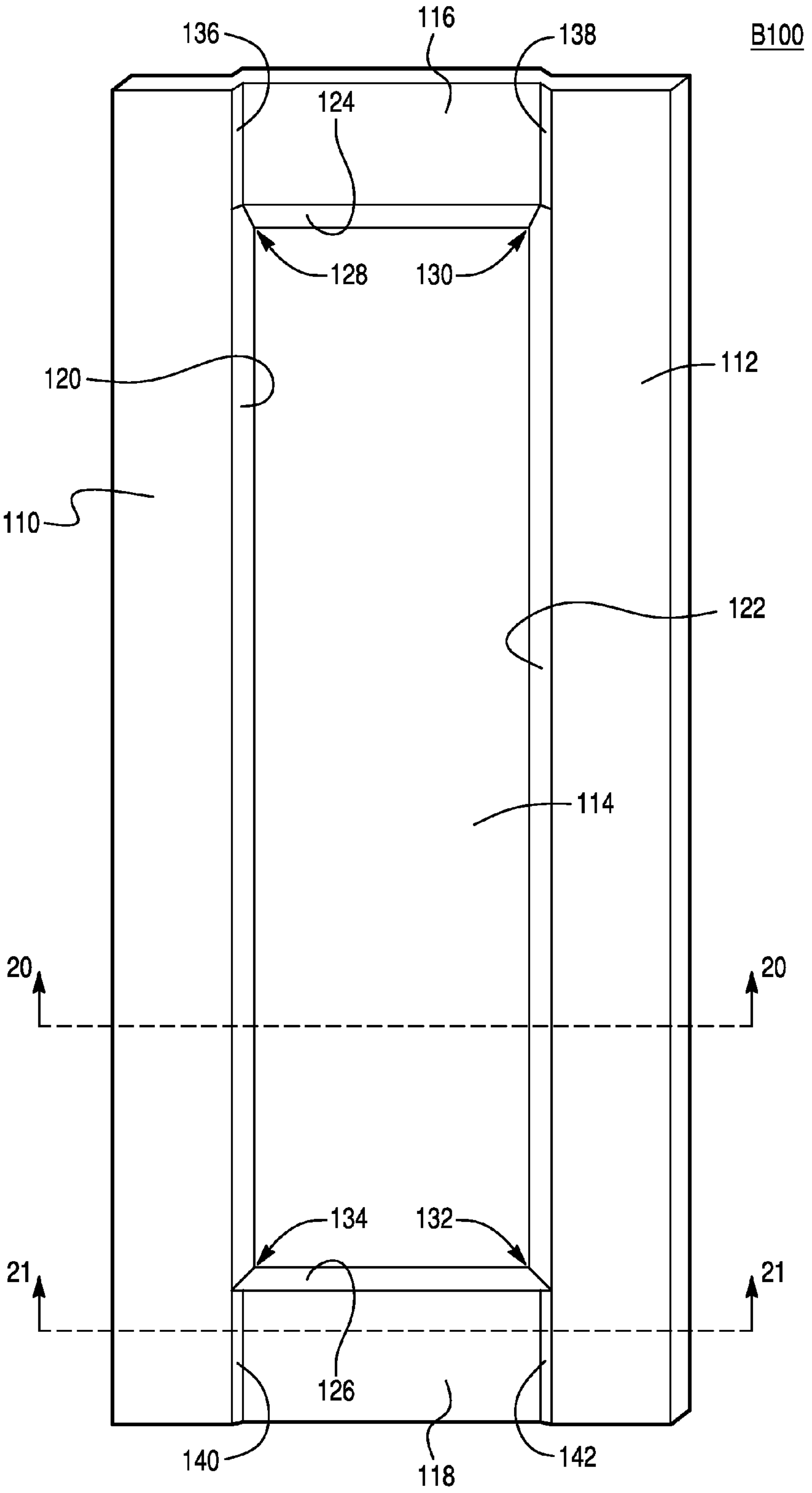
FIG. 19 is an elevational view of a door skin blank according to alternative configuration.

An alternative configuration of a door skin blank B100 is best shown in FIG. 19. Blank B100 is formed to have oppositely disposed molded stiles 110, 112 lying on a first plane, a flat planar portion 114 disposed between and integral with stiles 110, 112 and lying on a second plane spaced from the first plane of stiles 110, 112, and rails 116, 118 lying on a third plane intermediate the first and second planes. Preferably, rails 116, 118 are formed at opposite ends of planar portion 114.

Similar to universal door skin blank B, stiles 110, 112 preferably have a standard width of about 6 inches. Rails 116, 118 preferably have a width of between about 6 inches to about 12 inches, more preferably between about 7 inches to about 10 inches. Rails 116, 118 may have differing widths. Planar portion 114 extends between rail 116 and rail 118, having a substantially constant length between rails 116, 118 of blank B100. Planar portion 114 also extends between stiles 110, 112, having a substantially constant width between stiles 110, 112. As such, planar portion 114 has a rectangular shape, defined by stiles 110, 112 and rails 116, 118.

Planar portion 114 of blank B100 is preferably recessed relative to stiles 110, 112 by about 3 mm to about 11 mm. In addition, rails 116, 118 are recessed from the outer planar surface of stiles 110, 112 on blank B100, preferably from between about 0.1 mm to about 0.6 mm. Therefore planar portion 114 is also recessed from rails 116, 118 from between about 5.4 mm to about 8.9 mm.

Figure 20:
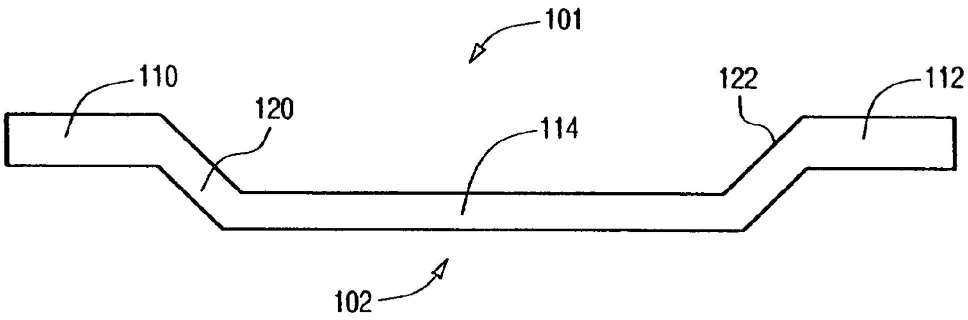
FIG. 20 is a cross-sectional view taken along the line 20-20 of FIG. 19 and viewed in the direction of the arrows.

A stile interface 120 is disposed between and contiguous with planar portion 114 and stile 110, as best shown in FIGS. 19 and 20. Likewise, a stile interface 122 is disposed between and contiguous with stile 112 and planar portion 114. Stile interfaces 120, 122 preferably extend at an angle of 45° relative to the plane of planar portion 114. However, it is understood that stile interfaces 120, 122 may be formed to extend at any desired angle during formation of blank B100. In addition, a rail interface 124 is disposed between and contiguous with planar portion 114 and rail 116. A rail interface 126 is disposed between and contiguous with rail 118 and planar portion 114, and also preferably extends at an angle of 45° relative to the plane of planar portion 114. Stile interfaces 120, 122 are therefore perpendicular to rail interfaces 124, 126, forming corners 128, 130, 132 and 134, as best shown in FIG. 19.

Interfaces 120, 122, 124 and 126 may include a contoured design, such as a curved portion or descending step portion, similar to interfaces 16, 18 of blank B. As such, interfaces 120, 122, 124 and 126 may also extend at an angle of 90° relative to the plane of planar portion 114. Mold trim may be secured to interfaces 120, 122 and/or 124, 126, as described above on blank B.

Figure 21:
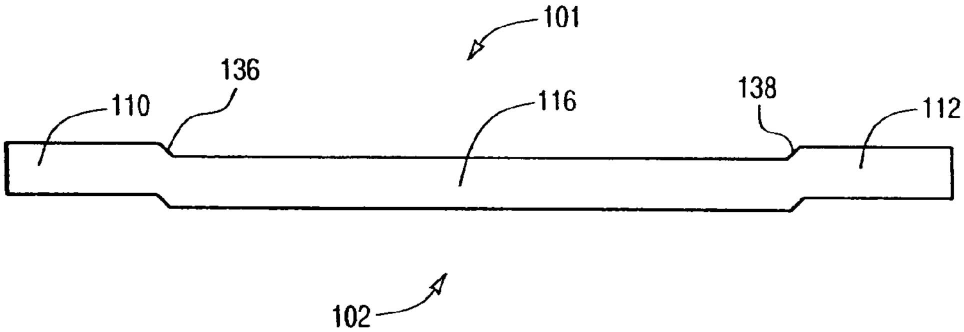
FIG. 21 is a cross-sectional view taken along the line 21-21 of FIG. 19 and viewed in the direction of the arrows.

An edge 136 is disposed between and contiguous with rail 116 and stile 110, as best shown in FIGS. 19 and 21. An edge 138 is disposed between and contiguous with rail 116 and stile 112. Likewise, edges 140 and 142 are disposed between and contiguous with rail 118 and stiles 110, 112, respectively. Preferably, edges 136, 138, 140 and 142 extend at an angle corresponding to the angle at which stile interfaces 120, 122 extend (i.e. preferably at an angle of 45°) relative to the plane of rails 116, 118, as well as the plane of stiles 110, 112. However, it should be understood that edges 136, 138, 140 and 142 may extend at any desired angle relative to the plane of rails 116, 118 (i.e. greater than or less than an angle of 45°).

Preferably, blank B100 is post-formed from a solid composite wood blank, such as a medium density fiberboard ("MDF") blank. However, blank B100 may also be formed from a non-solid bat of material, fiberglass, thermoplastic, or any other suitable material, as well known in the art. Blank B100 is formed to have an exterior, visible surface 101 and an interiorly disposed surface 102, as best shown in FIGS. 20 and 21. Planar portion 114 is recessed from stiles 110, 112 (and rails 116, 118) relative to exterior surface 101, but extends outwardly from stiles 110, 112 relative to interior surface 102, as best shown in FIG. 20. Rails 116, 118 are recessed from stiles 110, 112 relative to exterior surface 101, and may also extend outwardly from stiles 110, 112 relative to interior surface 102, as best shown in FIG. 21. Such a configuration, as shown in FIG. 21, provides a substantially uniform density throughout blank B100.

Figure 22:
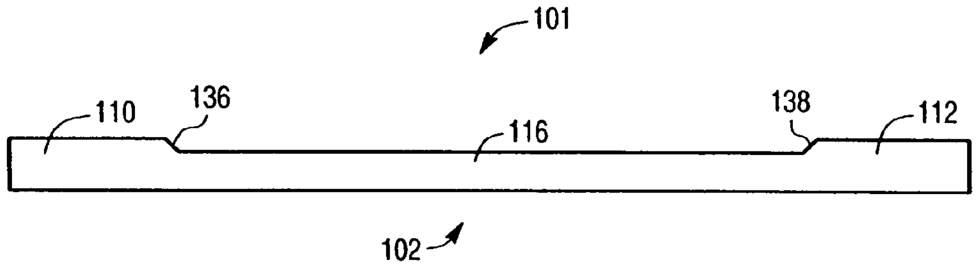
FIG. 22 is a cross-sectional view similar to FIG. 21 showing another embodiment of the interior surface of the blank B100.

Alternatively, interior surface 102 may be flush at areas corresponding to stiles 110, 112 and rails 116, 118, as best shown in FIG. 22. Note that rails 116, 118 are still recessed from stiles 110, 112 on exterior surface 101. If the interior surface 102 of rails 116, 118 and stiles 110, 112 are flush as shown in FIG. 22, a variable density results in the post-formed wood composite blank, wherein rails 116, 118 have a slightly higher density as compared to stiles 110, 112. The flush configuration may be advantageous when securing blank B100 to a peripheral frame, such as a door frame, because frame members may all be the same thickness. If the periphery of blank B100 is not substantially coplanar, notches or shims may need to be made in frame members to provide attachment locations. It should be noted however, that even if rails 116, 118 extend from interior surface 102 (as in FIG. 21), they only extend from the plane of interior surface 102 around the perimeter of blank B100 from between about 0.1 mm to about 0.6 mm, as noted above. This slight spacing between the plane of rails 116, 118 and the plane of stiles 110, 112 does not necessarily affect securement of the perimeter of interior surface 102 of blank B100 to a coplanar frame (having frame members of uniform thickness).

Figure 24:
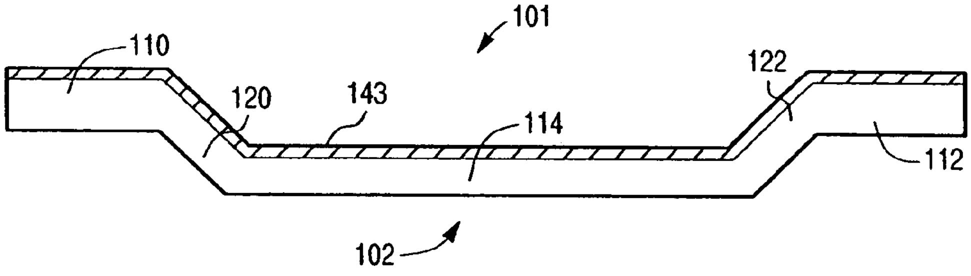
FIG. 24 is a cross-sectional view taken, along line 24-24 of FIG. 23 and viewed in the direction of the arrows.
Figure 23:
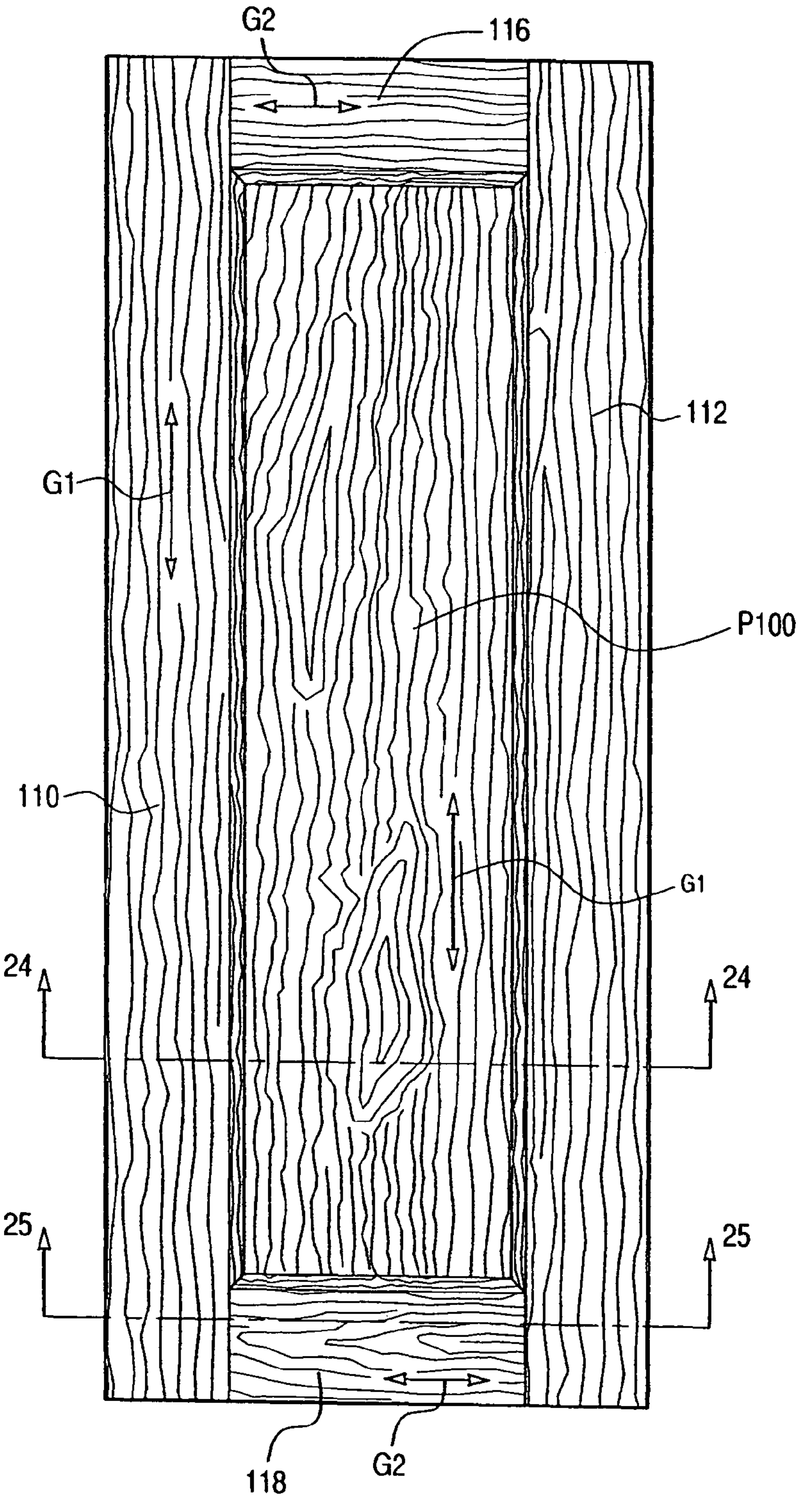
FIG. 23 is an elevational view of a door skin blank having the alternative configuration as in FIG. 19, and having a decorative layer on the exterior surface.

As best shown in FIGS. 23 and 24, blank B110 may include a decorative layer 143, such as a veneer, foil, paper overlay, resin impregnated paper, polymeric films, or the like. Decorative layer 143 may be finished or unfinished, or otherwise patterned. Note that decorative layer 143 is secured to exterior surface 101. Preferably, decorative layer 143 is compressed onto and secured to blank B110 during post-molding formation of blank B110, as described above for decorative layer 20 on blank B3. The preferred temperature range used during compression is 140° C. to 165° C. in order to minimize the amount of stretching and wrinkling of decorative layer 143. Decorative layer 143 preferably has a wood grain pattern, with the grain running parallel to stiles 110, 112, as shown by arrows G1 in FIG. 23. However, the wood grain pattern of decorative layer 143 runs perpendicular to rails 116, 118. It should be understood that decorative layer 143 may also have some other decorative pattern, such as a textured or solid color pattern, pursuant to consumer preference.

Figure 25:
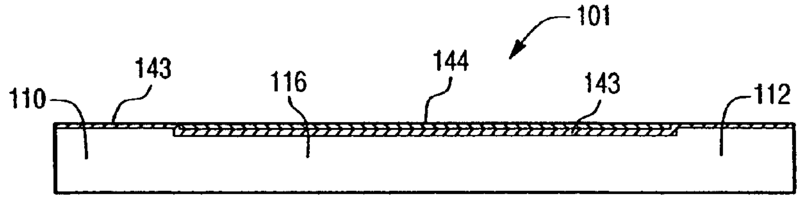
FIG. 25 is a cross-sectional view taken along line 25-25 of FIG. 23 and viewed in the direction of the arrows.
Figure 25A:
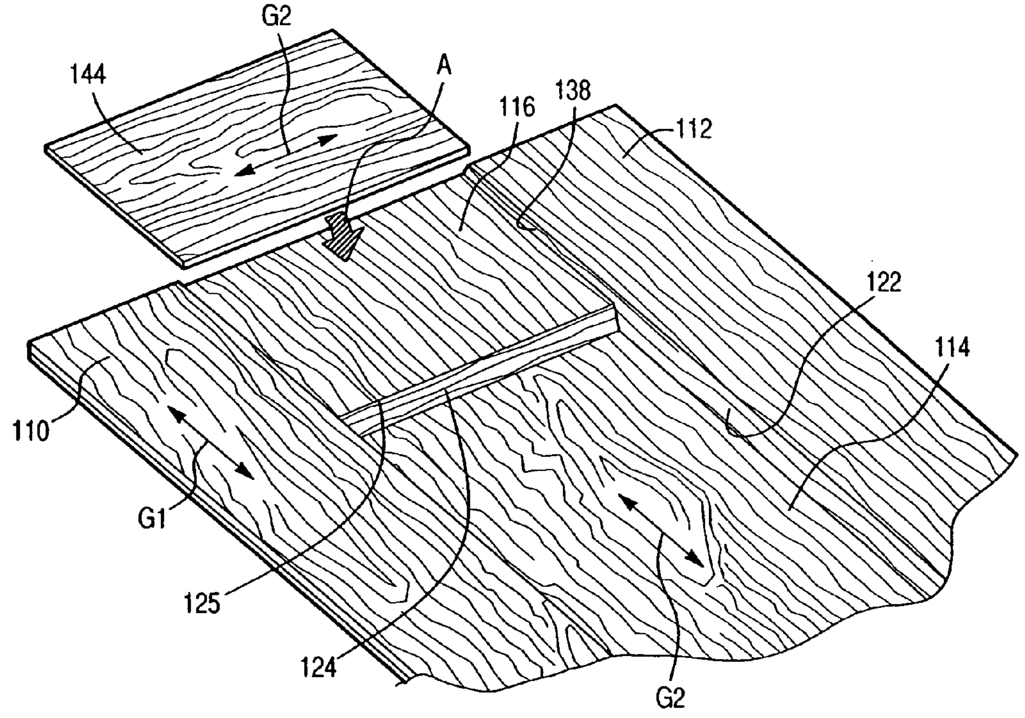
FIG. 25A is a fragmentary assembly view of the door skin of FIG. 23 prior to securing the decorative rail layer to the rail.

After decorative layer 143 is secured to blank B110 during post-form molding and the blank B110 removed from the post-form press, decorative rail layers 144 and 146 are secured over decorative layer 143 covering rails 116, 118, as best shown in FIGS. 23, 25 and 25A. As best shown in FIG. 25A, decorative rail layer 144 is secured over decorative layer 143 covering rail 116, as shown by arrow A. Decorative rail layers 144, 146 are sized to match rails 116, 118, and may cover interfaces 124, 126, respectively. Alternatively, decorative rail layers 144, 146 may be sized to cover only rails 116, 118. As shown in FIG. 25A, for example, decorative rail layer 144 may be sized to extend only to a periphery 125 of rail 144, in which case interface 124 remains covered only by decorative layer 143. Decorative rail layers 144, 146 may also be sized to extend onto and cover edges 136, 138, 140 and 142. Decorative rail layers 144, 146 may be a veneer, foil, paper overlay, or the like. Decorative rail layers 144, 146 are preferably adhesively secured onto decorative layer 143, covering rails 116, 118, such as with an adhesive, by using a pneumatic hot stamper, a press, or other compression method known in the art.

Preferably, decorative rail layers 144, 146 range in thickness from between about 0.1 mm to about 0.6 mm. After decorative rail layers 144, 146 are secured onto decorative layer 143 covering rails 116, 118, the plane of decorative rail layers 144, 146 may be flush and coplanar with the plane of decorative layer 143 covering stiles 110, 112, as best shown in FIG. 25. Alternatively, the plane of decorative rail layers 144, 146 may be recessed from the plane of decorative layer 143 covering stiles 110, 112. However, the plane of decorative rail layers 144, 146 should not extend above the plane of decorative layer 143 covering stiles 110, 112 (relative to exterior surface 101).

Decorative rail layers 144, 146 preferably have a wood grain pattern, and are secured to rails 116, 118, respectively, so that the wood grain runs parallel to rails 116, 118, as shown by arrows G2 in FIGS. 23 and 25A. As such, the wood grain pattern G1 on stiles 110, 112 and planar portion 114 runs perpendicular to the wood grain pattern G2 on rails 116, 118. The resulting blank B100 (and B110) therefore simulates a one-panel door facing, wherein planar portion 114 simulates panel P100, as best shown in FIG. 23.

Figure 26:
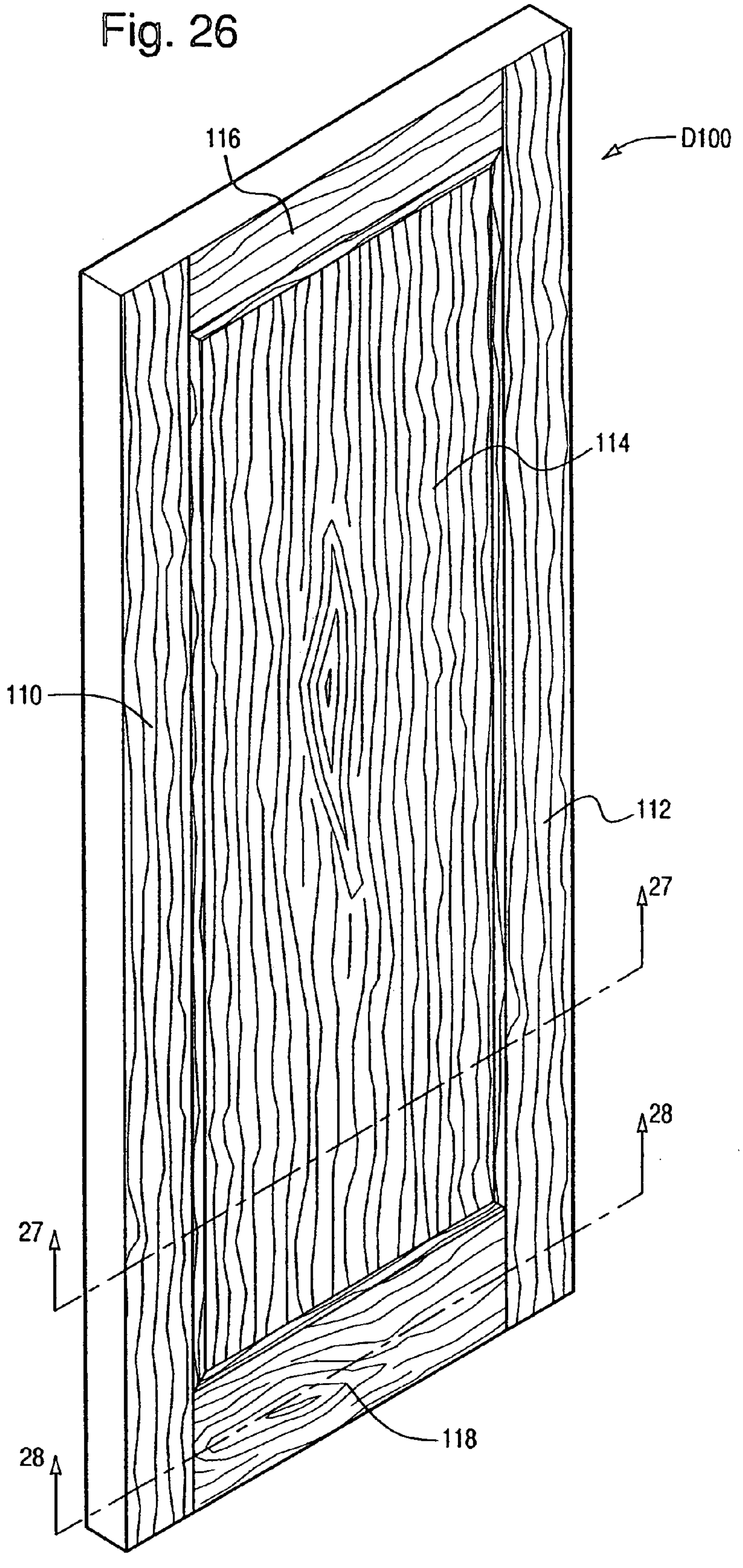
FIG. 26 is a perspective view of a door having the alternatively configured door skin of FIG. 23.
Figure 27:
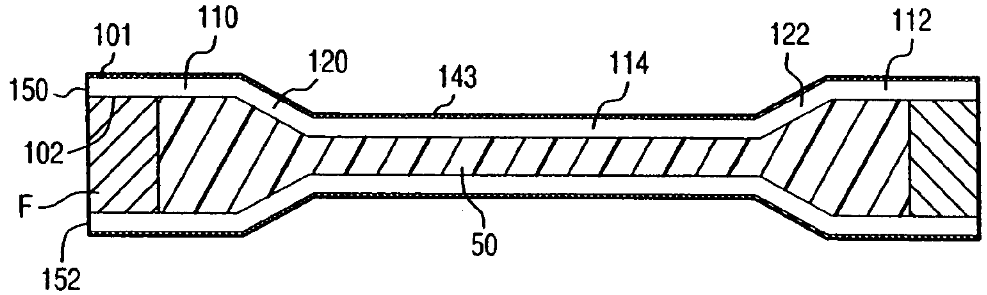
FIG. 27 is a cross-sectional view taken along line 27-27 of FIG. 26 and viewed in the direction of the arrows.
Figure 28:
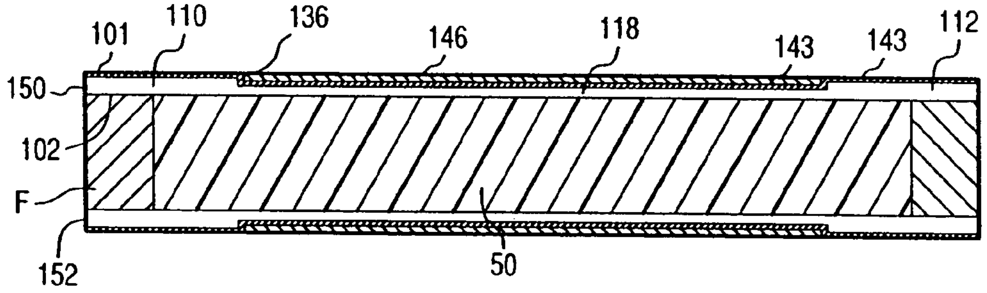
FIG. 28 is a cross-sectional view taken along line 28-28 of FIG. 26 and viewed in the direction of the arrows.

As best shown in FIGS. 26, 27 and 28, door D100 includes a peripheral frame F, preferably formed of wood, having oppositely disposed sides, as known in the art. First and second door skins 150, 152 are provided. Each skin has an exterior side 101 and an interior side 102. Each of interior sides 101 is adhesively secured to a corresponding side of frame F, through the use of polyvinyl acetate or the like. At least one of door skins 150, 152 is formed to have spaced stiles 110, 112, planar portion 114, and rails 116, 118, as described above. Door D100 simulates a one-panel door. A filler 50 or honeycomb material may be disposed between the first and second skins 150, 152, as described above for door D1. One or both of skins 150, 152 may also include decorative layer 143 and decorative rail layers 144, 146, as best shown in FIGS. 27 and 28. Skins 150, 152 are shown in FIG. 28 as having a configuration as shown in FIG. 25, wherein the interior surface 102 of stiles 110, 112 and rails 116, 118 is coplanar, skins 150, 152 may also be formed so that interior surface 102 of rails 116, 118 is spaced from stiles 110, 112 (as shown in FIG. 21). Also, it should be understood that the skins 150, 152 may have one or more intermediate rails to simulate a two or more panel door if desired, such intermediate rails to be separately formed and attached, as described above.

Door D100, comprising at least one door skin B100 (or B110), provides some advantages over universal door skin blank B. Specifically, skin B100 (or B110) may be secured to a conventional door frame F. Universal door blank B requires a frame that is notched or thinner in areas corresponding to panel portion 14, since panel portion 14 is recessed at opposing ends (where frame F is internally secured). As such, manufacturing cost and time is reduced using door skin B100 (or B110). Furthermore, door skin B100 (or B110) provides increased strength and rigidity, given the configuration of rails 116, 118 permit thicker frame members around the perimeter of door D100.

In an alternative embodiment, a prelaminated substrate 200 comprises a flat substrate 201, preferably comprised of MDF, hardboard, OSB or the like, with a laminated decorative layer 203, such as a veneer, foil, paper overlay, resin impregnated paper, polymeric films, or the like. An exemplary section of a laminated substrate 200 is best shown FIG. 29. The decorative layer 203 is laminated to the substrate 201 preferably with a UF or MUF resin, or a PVA adhesive. The laminated substrate 200 is then post-formed into a door skin blank, such as blanks B and B100 shown in FIGS. 1 and 19. An exemplary door skin blank 202 is best shown in FIG. 30, however, the specific design of the door skin may be determined by an individual user as required for a specific application. A door skin blank formed from a substrate that has been laminated with a decorative coating is referred to in this application as a "pre-laminated blank door skin".

Figure 29:
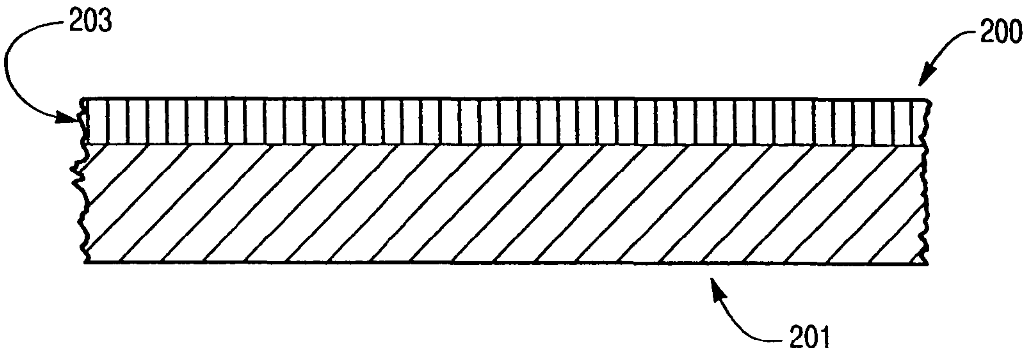
FIG. 29 is a cross-sectional view of a laminated substrate.
Figure 30:
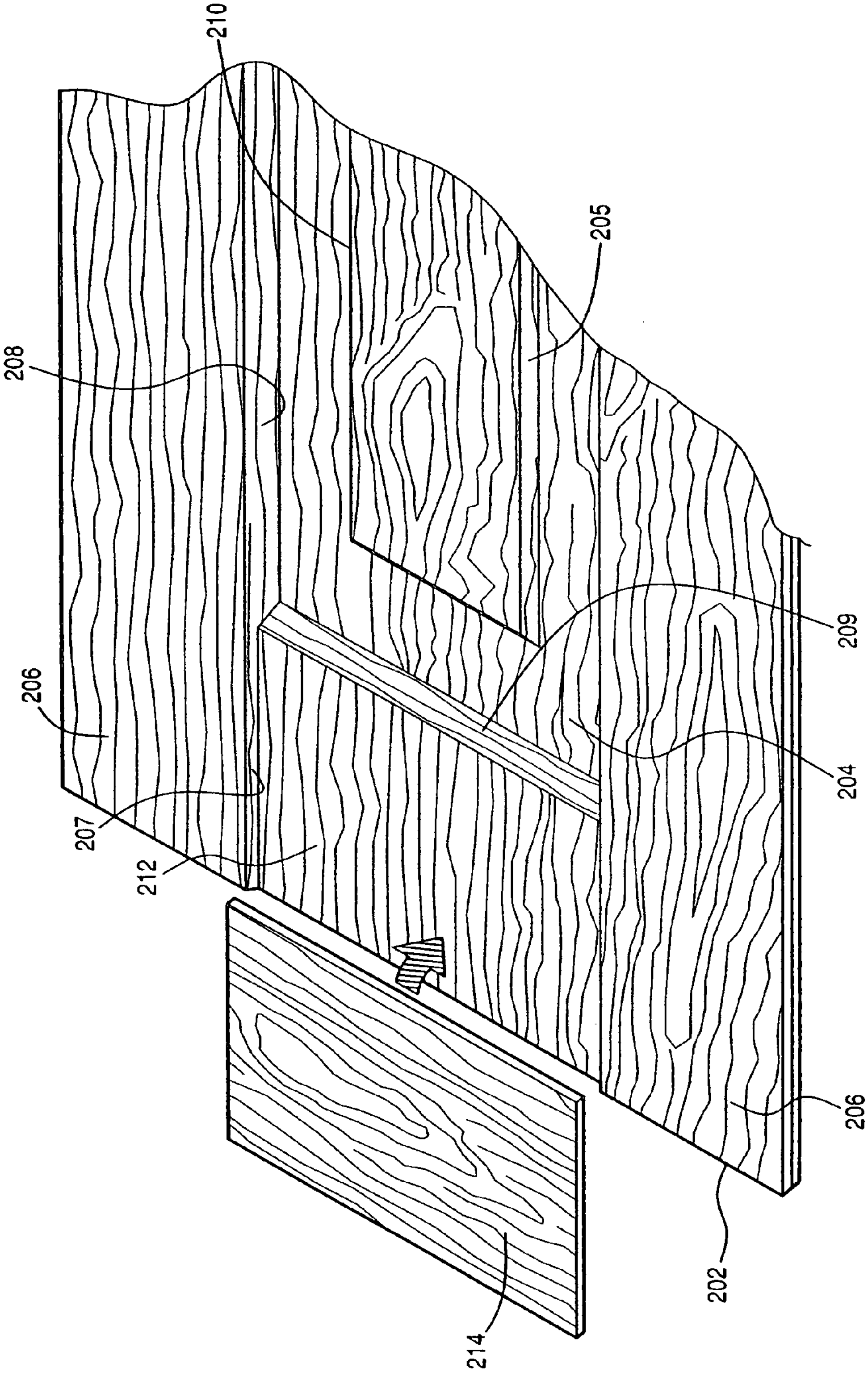
FIG. 30 is a fragmentary assembly view of a pre-laminated door skin blank.

As noted, the flat, pre-laminated substrate 200 (as best shown in FIG. 29) is subjected to a reforming or post-forming process. The reforming process may comprise any reforming process known in the art whereby the pre-laminated substrate 200 is molded into a pre-laminated door skin blank, such as blank 202 shown in FIG. 30. The door skin blank 202 may be molded to recess the center panel 204 to a depth 3-11 mm relative to the a plane defined by the horizontal laminated surface of the stiles 206. An angularly disposed interface region 208 extends between the door stiles 206 and the recessed center panel 204. The interface region 208 may have an angle of 30-70 degrees relative to a plane defined by the horizontal laminated surface of the door stiles 206. The center panel 204 may have an inner panel 210, preferably raised 0-2 nm relative to the plane defined by the horizontal laminated surface of the center panel 204. An angularly disposed interface region 205 extends between the center panel 204 and the raised inner panel 210. The top and bottom rails 212 may also be recessed 0.25-0.6 mm relative to the horizontal plane defined by the horizontal laminated surface of the stiles 206. An angularly disposed interface region 207 extends between the stiles 206 and the rails 212. An angularly disposed interface region 209 also extends between the rails 212 and the center panel 204.

After the pre-laminated substrate 200 has been reformed into door skin 202, the door skin 202 may be moisturized at room temperature to achieve an 8-12% moisture content. The applicants have found that re-moisturizing the pre-laminated door skin blanks at room temperature prevents warping of the door skin and eliminates performance issues in the manufactured door.

As best shown in FIG. 30, after the reforming and moisturizing processes are complete, a 0.25-0.6 mm veneer 214 may be attached to the top and bottom rail areas 212. Although the veneer 214 may have any pattern, if the veneer 214 has a wood grain pattern it preferably is oriented perpendicular to the wood pattern visible on the center panel 204 and stiles 206. The wood grain veneer 214 gives the completed door a more natural and crafted appearance.

After the lamination, forming, and finishing processes, the door skin blank B may resemble the door skin blank B3 best shown in FIG. 5 or door skin blank B110 shown in FIG. 23. However, the specific number of recessed and elevated surfaces formed into a particular door skin is a design choice made by an individual user for a specific application. All such design choices and door configurations are considered within the scope of the present invention.

Figure 31:
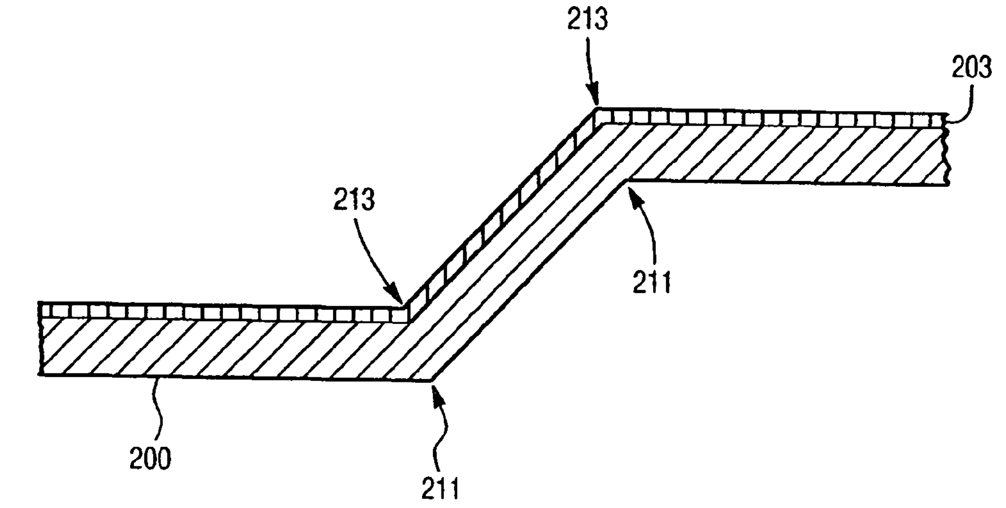
FIG. 31 is a cross-sectional view of a laminated door skin after the forming process.

During the reforming process, pre-laminated substrate 200 is placed into a reforming press where significant heat and pressure are applied to reform the substrate 200 into a door skin. An exemplary cross-section of a reformed pre-laminated substrate 200 is best shown in FIG. 31. As a part of the reforming process, the substrate 200 is "bent" at fold edges 211 corresponding to the angular interface areas 205, 207, 208, 209. When the substrate 200 is bent, the decorative layer 203 at the fold edges 211 must stretch or compress to compensate for the bending of the substrate 200. Should the decorative layer 203 fail to sufficiently stretch or compress in unison with the substrate 201, cracks 213 may develop in the surface of the decorative layer 203 at the fold edges 211. The cracks 213 provide an unacceptable appearance to consumers, however.

Figure 32:
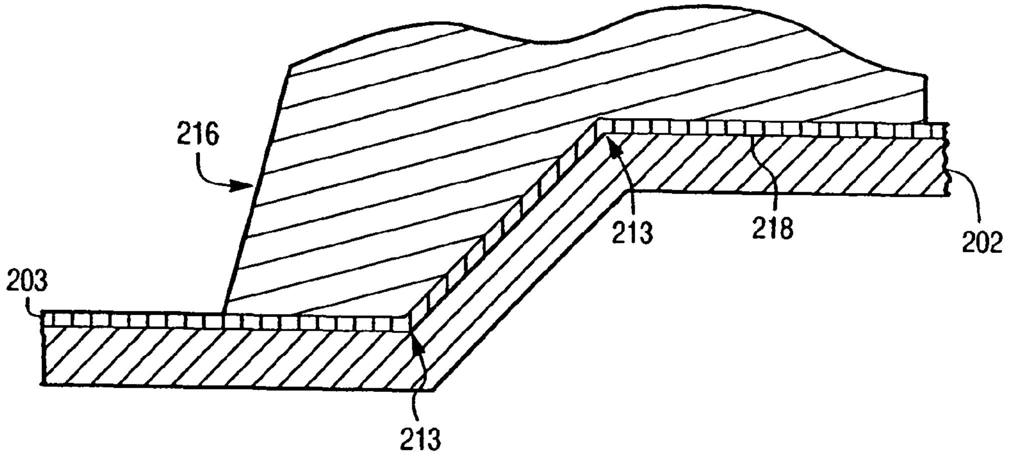
FIG. 32 is a cross-sectional view of a laminated door skin with molding covering the fold points.
Figure 33:
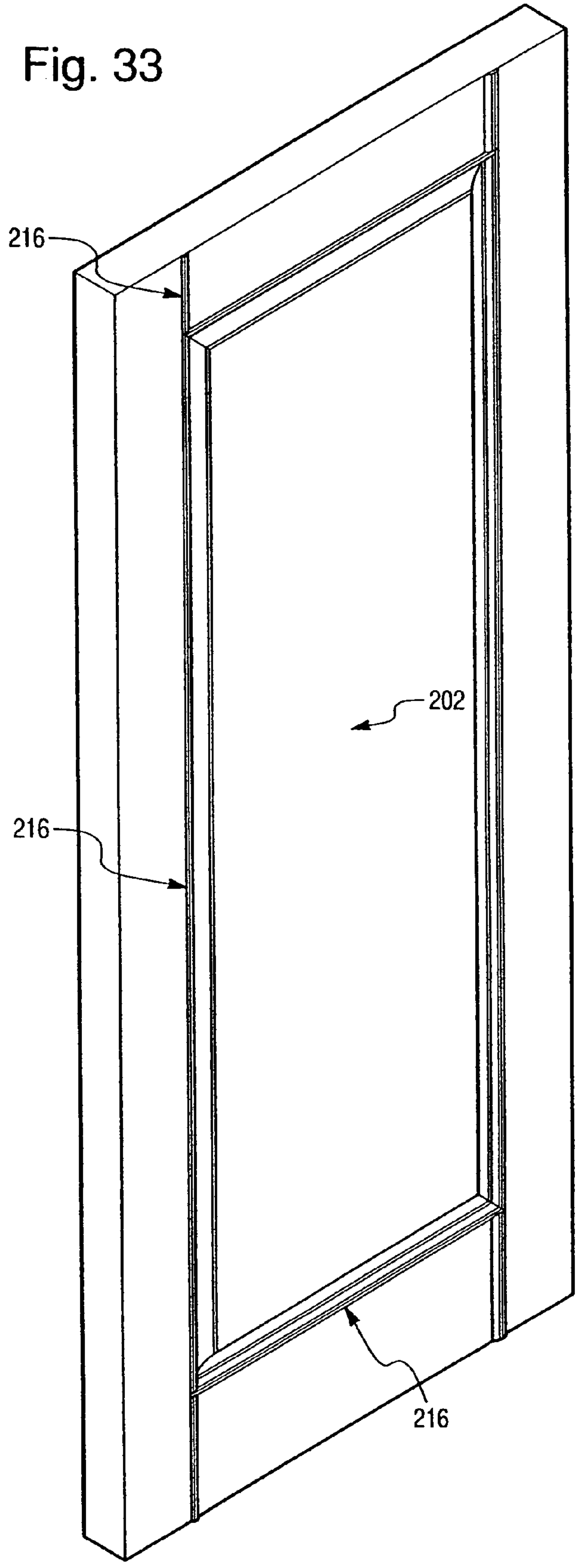
FIG. 33 is a perspective view of a door skin with attached molding.

One way of addressing the lamination cracks 213 is through the application of an ornamental molding 216. An exemplary cross-section of a door skin 202 with the ornamental molding 216 installed is best shown in FIG. 32. The ornamental molding 216 covers the lamination cracks 213, thus precluding them from being seen by consumers. The molding 216 also amplifies the door skin 202 molded recesses and complements the decorative features of the door skin 202. To further enhance the door's appearance, the molding 216 may have a contrasting color to accentuate the contrast between the door skin 202 and the ornamental molding 216. The interior side of the molding 216 conforms to the angular interface surfaces 205, 207, 208, 209 (as best shown in FIG. 30) and is fixedly attached to the door skin 202. The molding 216 may be comprised of solid wood, MDF wrapped with decorative paper or veneer, or the molding may be comprised of any alternate material consistent with the appearance and function of the molding 216. FIG. 33 shows a door manufactured from door skin 202 with the molding 216 installed.

In yet another embodiment, a thermal transfer foil may be used to dry coat the veneer laminated MDF based panel substrate 200. The thermal transfer foil used in this invention consists of 1) an adhesive layer to be adhered to a substrate, 2) a polymeric coating layer, 3) a film release layer, and 4) a polymer carrier that holds the all three layers in solid film form and allows them to be transferred and applied to the substrate.

The transfer foil preferably has a transparent coating layer, which coating layer may be either clear or tinted. The transparent transfer foil may be used to coat a veneer laminated MDF door skin, such as door skin 202, under application of heat in a membrane press. Because the post-molded veneer MDF door skin 202 has molding trims to cover the cracks in the molding profile, a relatively low cost transfer foil, such as used for flat panel finishing, may be used to coat the veneer laminated MDF surface. The transfer foil in that event does not need to cover the molded profile completely, because the profile will be covered by the molding trims. A transfer foil designed for flat panel finishing or simple molding profile costs less than that designed for true three-dimensional profile finishing.

Additionally, the standard veneer laminated MDF surface is sanded during the manufacturing process, so the transfer foil can be applied directly without incurring the cost of further post-sanding steps. Lamination or other application of an unsanded veneer to a post-molded door skin panel typically must be subsequently sanded for coating purposes in order to be commercially usable.

The disclosed process provides a post-molded veneer MDF surface with decorative molding trims at a much lower cost than that provided by a conventional coating process involving multiple steps of sanding, staining, and coating with water or solvent based finishing materials.

We prefer that the transfer foil have either a transparent or tinted coating layer. The transparent coating layer is used in order to allow the natural color and natural appearance of the decorative layer 203 to be apparent to a consumer. A tinted coating layer is utilized in order to accentuate or alter the natural color of the underlying decorative layer 203. For example, if the decorative layer is an cherry veneer, a tinted coating layer may be utilized to give the appearance of red cherry color, for example.

As noted, use of the transfer foil avoids the need for further sanding and conventional coating process of the reformed surface of door skin 202 prior to shipping the resulting door. The transfer foil causes the door skin 202 to have a furniture quality finish. The high quality surface provides an attractive appearance, while decreasing costs through avoidance of the sanding and other related finishing steps.

Although the present invention has been explained with reference to a door skin and a door, it is to be understood that the disclosed invention is also applicable to other formed panels, such as a wainscot panel, or other doors, such as cabinet, furniture or wardrobe doors. It will be apparent to one of ordinary skill in the art that various modifications and variations can be made in construction or configuration of the present invention without departing from the scope or spirit of the invention.

We claim:

1. A method of producing a door, comprising the steps of:

forming first and second wood composite laminated substrates into first and second universal door skin blanks, each of the universal door skin blanks having an exterior side and an interior side and comprising first and second spaced stiles having first outer surfaces in a first plane, first and second interface portions integral with the first and second stiles, respectively, a substantially flat planar portion disposed between and integral with the first and second interface portions and having a second outer surface in a second plane offset from the first plane, and at least one rail receiving portion having a third outer surface in a third plane intermediate the first and second planes;

securing a first rail member on the rail receiving portion of the first universal door skin blank so that the first rail member extends between the first and second stiles; and securing the interior sides of the formed universal door skin blanks to opposite sides of a peripheral door frame.

2. The method of claim 1, wherein the substantially flat planar portion is recessed relative to the stiles 6 mm to 9 mm.

3. The method of claim 1, further comprising the steps of:

providing a second rail;

placing the second rail at any position along the substantially flat planar portion not occupied by the first rail so that the second rail extends between the stiles.

4. The method of claim 3, further comprising the step of providing an intermediate stile and positioning the intermediate stile on the substantially flat portion so that the intermediate stile is oriented parallel to the first and second stiles and extends between the first rail and the second rail.

5. The method of claim 1, wherein the at least one rail receiving portion comprises first and second rail receiving portions, wherein the first rail member is secured to the first rail receiving portion, and wherein the method further comprises securing a second rail member to the second rail receiving portion.

6. The method of claim 5, wherein the first and second rail receiving portions are positioned at opposite ends of the universal door skin blank.

7. A method of producing a door, comprising the steps of:

forming a substrate into a universal door skin blank comprising a pair of spaced stiles each having a first outer surface in a first plane, a substantially flat planar portion having a second outer surface in a second plane spaced from the first plane of the stiles, and first and second rail receiving portions having third outer surfaces in a third plane between the first and second planes, wherein the first and second rail receiving portions and the substantially flat planar portion extend between the stiles, and the substantial flat planar portion extends between the first and second rail receiving portions; and securing an interior side of the formed universal door skin blank to a frame.

8. The method of claim 7, wherein at least one of the substrates comprises a laminated substrate.

9. The method of claim 8, further comprising the step of re-moisturizing the laminated substrate sufficient to prevent subsequent warping in said universal door skin blank.

10. The method of claim 9, wherein said re-moisturizing of the laminated substrate is to a moisture content of between 8 and 12 percent.

11. The method of claim 7, further comprising securing first and second rails on the first and second rail receiving portions, respectively.

12. The method of claim 11, further comprising securing a third rail on the substantially flat portion between the first and second rails.

13. A method of producing a door skin blank, comprising the steps of:

positioning a laminated composite comprising a substrate and a decorative layer adhesively bonded to the substrate between an upper die and a lower die of a die set, the dies possessing forming surfaces facing one another to defined a chamber when the die set is closed, the forming surfaces of the chamber being shaped to mold the composite into a shaped universal door skin blank comprising first and second spaced stiles having first outer surfaces in a first plane, a substantially flat planar portion having a second outer surface in a second plane spaced from the first plane, and at least one planar rail receiving portion having a third outer surface in a third plane intermediate the first and second planes, the substantially flat planar portion and planar rail receiving portion extending between the stiles, the decorative layer comprising a member selected from the group consisting of a veneer, a foil, a polymeric film, and a paper overlay;

trimming the laminated composite; and compressing the laminated composite using heat and pressure to form the laminated composite into the shaped universal door skin blank.

14. The method of forming a molded door skin blank according to claim 13, further comprising the steps of:

applying an ornamental molding to cover cracks in the shaped universal door skin blank; and adhering to the shaped universal door skin blank a transfer foil having a transparent coating layer.

15. The method of claim 14, wherein said transparent coating layer is tinted.

16. The method of claim 13, further comprising the step of:

re-moisturizing the substrate of the laminated composite sufficient to prevent subsequent warping in the shaped universal door skin blank.

17. The method of claim 16, wherein said re-moisturizing of the substrate is to a moisture content of between 8 and 12 percent.

18. The method of claim 13, wherein the substrate comprises a composite wood material.

19. The method of claim 18, wherein the composite wood material comprises a medium density fiberboard material.

20. The method of claim 13, wherein the substrate comprises a fiberglass material.

21. The method of claim 13, wherein the substrate comprises a thermoplastic material.

22. The method of claim 13, wherein the adhesive is polyvinyl acetate.

* * * * *